US009112767B2

(12) United States Patent
Ansari et al.

(10) Patent No.: US 9,112,767 B2
(45) Date of Patent: *Aug. 18, 2015

(54) METHOD AND AN ACCUMULATOR SCOREBOARD FOR OUT-OF-ORDER RULE RESPONSE HANDLING

(71) Applicant: Cavium, Inc., San Jose, CA (US)

(72) Inventors: Najeeb I. Ansari, San Jose, CA (US); Gregg A. Bouchard, Georgetown, TX (US); Rajan Goyal, Saratoga, CA (US); Jeffrey A. Pangborn, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/844,451

(22) Filed: Mar. 15, 2013

(65) Prior Publication Data
US 2014/0279806 A1 Sep. 18, 2014

(51) Int. Cl.
*G06F 17/00* (2006.01)
*G06N 5/02* (2006.01)
*H04L 12/701* (2013.01)

(52) U.S. Cl.
CPC .................................. *H04L 45/00* (2013.01)

(58) Field of Classification Search
None
See application file for complete search history.

(56) References Cited

U.S. PATENT DOCUMENTS

| 7,558,925 | B2 * | 7/2009 | Bouchard et al. | 711/154 |
| 8,176,300 | B2 * | 5/2012 | Goyal et al. | 712/220 |
| 8,301,788 | B2 * | 10/2012 | Bouchard et al. | 709/230 |
| 8,392,590 | B2 * | 3/2013 | Bouchard et al. | 709/230 |
| 8,472,452 | B2 * | 6/2013 | Goyal et al. | 370/400 |
| 8,560,475 | B2 * | 10/2013 | Hussain et al. | 706/45 |
| 8,601,139 | B2 * | 12/2013 | Goyal et al. | 709/228 |
| 8,606,959 | B2 * | 12/2013 | Goyal et al. | 709/234 |
| 8,711,861 | B2 * | 4/2014 | Goyal et al. | 370/392 |
| 8,719,331 | B2 * | 5/2014 | Goyal et al. | 709/201 |
| 8,818,921 | B2 * | 8/2014 | Hussain et al. | 706/12 |
| 8,923,306 | B2 * | 12/2014 | Bouchard et al. | 370/400 |
| 8,954,700 | B2 * | 2/2015 | Ansari et al. | 711/165 |
| 8,966,152 | B2 * | 2/2015 | Bouchard et al. | 711/5 |
| 8,995,449 | B2 * | 3/2015 | Goyal et al. | 370/400 |
| 2013/0036185 | A1 | 2/2013 | Ansari et al. | |

(Continued)

OTHER PUBLICATIONS

The Improvement Research on Rule Matching Algorithm Rete in Electronic Commerce Application Systems Ren, Zhijun ; Wang, Dongyun Wireless Communications, Networking and Mobile Computing, 2008. WiCOM '08. 4th International Conference on DOI: 10.1109/WiCom.2008.3016 Publication Year: 2008, pp. 1-4.*

(Continued)

*Primary Examiner* — Michael B Holmes
(74) *Attorney, Agent, or Firm* — Hamilton, Brook, Smith & Reynolds, P.C.

(57) ABSTRACT

According to at least one example embodiment, a method and a corresponding accumulator scoreboard for managing bundles of rule matching threads processed by one or more rule matching engines comprise: recording, for each rule matching thread in a given bundle of rule matching threads, a rule matching result in association with a priority corresponding to the respective rule matching thread; determining a final rule matching result, for the given bundle of rule matching threads, based at least in part on the corresponding indications of priorities; and generating a response state indicative of the determined final rule matching result for reporting to a host processor or a requesting processing engine.

20 Claims, 18 Drawing Sheets

(56) References Cited

U.S. PATENT DOCUMENTS

| | | | |
|---|---|---|---|
| 2013/0036274 | A1 | 2/2013 | Ansari et al. |
| 2013/0036284 | A1 | 2/2013 | Ansari et al. |
| 2013/0036285 | A1 | 2/2013 | Ansari et al. |
| 2013/0036288 | A1 | 2/2013 | Ansari et al. |
| 2013/0067173 | A1 | 3/2013 | Pangborn et al. |
| 2014/0279805 | A1 | 9/2014 | Pangborn et al. |

OTHER PUBLICATIONS

MP-Room: Optimal Matching on Multiple PDUs for Fine-Grained Traffic Identification Hao Li ; Chengchen Hu Selected Areas in Communications, IEEE Journal on vol. 32, Issue: 10 DOI: 10.1109/JSAC.2014.2358835 Publication Year: 2014, pp. 1881-1893.*

Research on the Promotion of Rule Engine Performance Gang Zhang; Wenwei Shan ; Feng Wang Intelligent Systems and Applications (ISA), 2010 2nd International Workshop on DOI: 10.1109/IWISA.2010.5473495 Publication Year: 2010, pp. 1-3.*

Investigation and management solution for privacy identification and electrical energy theft Kannan, A. ; Krishnan, A.S. ; Krishnan, S.M.; Bindu, K.V.; Rabi, B.J. Electronics, Communication and Computing Technologies (ICECCT), 2011 International Conference on DOI: 10.1109/ICECCT.2011.6077073 Publication Year: 2011, pp. 73-77.*

Che, C., et al., "Inference on heterogeneous e-marketplace activities," *Department of Computer and Information Science, IEEE International Conference on Systems, Man, and Cybernetics*, pp. 3634-3639 (2009).

Li, H., et al., "MP-Room: Optimal Matching on Multiple PDUs for Fine-Grained Traffic Indentification," *IEEE Journal on Selected Areas in Communications*, 32(10): 1881-1893 (2014).

Khan, O., et al., "*Thread Relocation*: A Runtime Architecture for Tolerating Hard Errors in Chip Multiprocessors," *IEEE Transactions on Computers*, 59(5): 651-665 (2010).

Notice of Allowance dated Mar. 26, 2015 Issued in U.S. Appl. No. 13/843,992.

* cited by examiner

| EngID | State | Pri7 | Pri6 | Pri5 | Pri4 | Pri3 | Pri2 | Pri1 | Pri0 |
|---|---|---|---|---|---|---|---|---|---|
| 0 | S | N | | E | | | | | |
| 1 | S | | N | | N | E | | | |
| 2 | S | | | N | | | | | |
| 3 | S | N | | | | | | | |
| 4 | S | | | | | N | | | |
| 5 | S | | | | | | | | |
| 6 | S | | | | N | | | M | X |
| 7 | S | | | | | | | | N |
| 8 | S | N | | | | | | | |
| 9 | S | | | | | | | N | E |
| 10 | S | | N | | | | | | |
| 11 | S | | | | | | N | | |
| 12 | S | | | | | | | | |
| 13 | S | | | | | | | | |

FIG. 9A: Table 1.

| State | Pri7 | Pri6 | Pri5 | Pri4 | Pri3 | Pri2 | Pri1 | Pri0 |
|---|---|---|---|---|---|---|---|---|
| S | N0 | N3 | N1 | N6 | N2 | N4 | N5 | M7 |

FIG. 9B

| State | Pri7 | Pri6 | Pri5 | Pri4 | Pri3 | Pri2 | Pri1 | Pri0 |
|---|---|---|---|---|---|---|---|---|
| S | N1 | N1 | N1 | N0 | N0 | N0 | M2 | N2 |

FIG. 9C

| State | Pri7 | Pri6 | Pri5 | Pri4 | Pri3 | Pri2 | Pri1 | Pri0 |
|---|---|---|---|---|---|---|---|---|
| S | N1 | N2 | N3 | E0 | M4 | X | X | X |

FIG. 9D

| State | Pri7 | Pri6 | Pri5 | Pri4 | Pri3 | Pri2 | Pri1 | Pri0 |
|---|---|---|---|---|---|---|---|---|
| S | N7 | N3 | M1 | N6 | N2 | N4 | N5 | N0 |

FIG. 9E

| State | Pri7 | Pri6 | Pri5 | Pri4 | Pri3 | Pri2 | Pri1 | Pri0 |
|---|---|---|---|---|---|---|---|---|
| S | N1 | N1 | N1 | N2 | N2 | N0 | M0 | N0 |

FIG. 9F

| State | Pri7 | Pri6 | Pri5 | Pri4 | Pri3 | Pri2 | Pri1 | Pri0 |
|---|---|---|---|---|---|---|---|---|
| S | N1 | N2 | N3 | E4 | M0 | X | X | X |

FIG. 9G

| State | Pri7 | Pri6 | Pri5 | Pri4 | Pri3 | Pri2 | Pri1 | Pri0 |
|---|---|---|---|---|---|---|---|---|
| S | M0 | N3 | N1 | N6 | N2 | N4 | N5 | E7 |

FIG. 9H

| State | Pri7 | Pri6 | Pri5 | Pri4 | Pri3 | Pri2 | Pri1 | Pri0 |
|---|---|---|---|---|---|---|---|---|
| S | N1 | N1 | N1 | N2 | N2 | N0 | M0 | E0 |

FIG. 9I

| State | Pri7 | Pri6 | Pri5 | Pri4 | Pri3 | Pri2 | Pri1 | Pri0 |
|---|---|---|---|---|---|---|---|---|
| S | N1 | N2 | N3 | M4 | E0 | X | X | X |

FIG. 9J

METHOD AND AN ACCUMULATOR SCOREBOARD FOR OUT-OF-ORDER RULE RESPONSE HANDLING

RELATED APPLICATION(S)

The entire teachings of U.S. application entitled "A Scheduling Method And Apparatus For Scheduling Rule Matching In A Processor" filed Mar. 15, 2013 Ser. No. 13/843,992 are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, Hyper Text Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

In a network search processor with multiple processing engines, bundles of rule matching threads initiated by a plurality of requesting engines may be processed by multiple rule matching engines. Rule matching threads, within a given bundle, are typically assigned relative priorities. A final rule matching result for the given bundle is determined based on rule matching results and assigned priorities associated with the respective rule matching threads in the given bundle. Herein, a method and corresponding apparatus, for efficiently tracking responses provided by rule matching engines and determining and final results corresponding to bundles to report to respective requesting processing engines or host processor(s) associated with different, are described.

According to at least one example embodiment, a method and a corresponding accumulator scoreboard for managing bundles of rule matching threads processed by one or more rule matching engines comprise: recording, for each rule matching thread in a given bundle of rule matching threads, a rule matching result in association with a priority corresponding to the respective rule matching thread; determining a final rule matching result, for the given bundle of rule matching threads, based at least in part on the corresponding indications of priorities; and generating a response state indicative of the determined final rule matching result for reporting to a host processor or a requesting processing engine.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 9A-9J describe representations of data maintained at the one or more memory banks.

DETAILED DESCRIPTION

Figure 1:
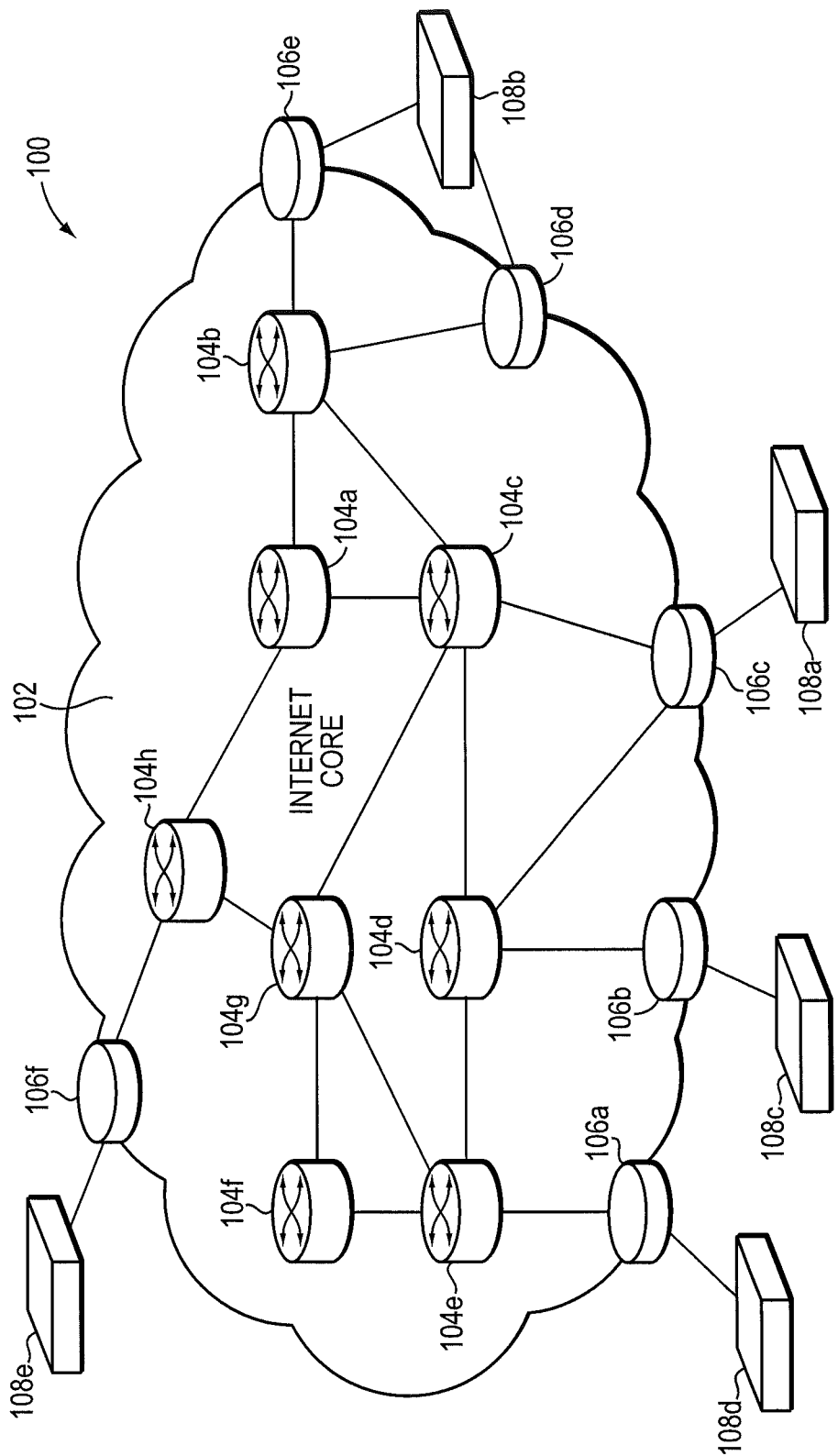
FIG. 1 is a block diagram of a typical network topology including network elements where a search processor may be employed.

A description of example embodiments of the invention follows.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Increasing demand for network bandwidth is generally due to the growth in data traffic. Leading service providers report bandwidths doubling on their backbone networks sometimes within six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, handling diverse types of rule sets without significant loss of performance calls for novel intelligent solutions of packet classification.

In addition, new technologies, such as multi-core processors provide unprecedented computing power, as well as highly integrated resources. Given such advanced hardware and software technologies, users also expect high network speed and performance that matches the speed of their devices. The high network performance and speed may be achieved by employing novel intelligent packet classification solutions.

Existing packet classification algorithms trade memory for time. Although the tradeoffs have been constantly improving, the time taken for a reasonable amount of memory is still generally poor.

Because of problems with existing algorithmic schemes, designers use ternary content-addressable memory (TCAM), which uses brute-force parallel hardware to simultaneously check packets against available classification rules. The main advantages of TCAMs over algorithmic solutions are speed and determinism. TCAMs work for all databases.

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header may be presented to a TCAM to determine which entry, or rule, it matches. However, the complexity of TCAMs has allowed only small, inflexible, and relatively slow implementations that consume a lot of power. Therefore, efficient algorithmic solutions operating on specialized data structures present a valuable alternative.

Mathematic solutions, proposed in the art, are shown to have excellent time/spatial complexity. However, such methods are typically not implementable in real-life network devices because the mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with a specific type of packet classification rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier includes a collection of rules or policies. Packets received are matched with rules, which determine actions to take with a matched packet. In generic packet classification, a router classifies a packet on the basis of multiple fields in a header of the packet. Each rule of the classifier specifies a class that a packet may belong to according to criteria on 'F' fields of the packet header. An identifier, e.g., class ID, is associated with each class. For example, each rule in a flow classifier is a flow specification, in which each flow is in a separate class. The identifier uniquely specifies an action associated with each rule. Each rule has 'F' fields. An ith field of a rule R, referred to as R[i], represents an expression or condition to be evaluated with the ith field of the packet header. A packet P matches a particular rule R if, for every i, the ith field of the header of P satisfies the expression or condition R[i]. The expression or condition R[i] may be for testing whether the value of the ith field of the packet header is within a specific value range, testing whether the value of the ith field of the packet header is exactly equal to a specific value, testing whether a value corresponding to a subset of the bits of the ith field of the packet header is equal to a given value, or the like.

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier, e.g., class ID, of the rule among them that appears first in the classifier.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to match a received packet with a rule in a classifier table to determine how to process the received packet.

In simple terms, the problem may be defined as finding one or more rules, e.g., matching rules, that match a packet. Before describing a solution to this problem, it should be noted that a packet may be broken down into parts, such as a header, payload, and trailer. The header of the packet, or packet header, may be further broken down into fields, for example. So, the problem may be further defined as finding one or more rules that match one or more fields of the packet header.

A possible solution to the foregoing problem(s) may be described, conceptually, by describing how a request to find one or more rules matching a packet or parts of the packet, a "lookup request," leads to finding one or more matching rules.

FIG. 1 is a block diagram 100 of a typical network topology including network elements where a search processor may be employed. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102, e.g., core routers 104b-e and 104h, are coupled with at least one edge router 106a-f. Each edge router 106a-f is coupled to at least one access router 108a-e.

The core routers 104a-104h are configured to operate in the Internet core 102 or Internet backbone. The core routers 104a-104h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f may be configured to employ a bridging protocol to forward packets from access routers 108a-e to core routers 104a-h and vice versa.

The access routers 108a-e may be routers used by an end user, such as a home user or an office, to connect to one of the edge routers 106a-f, which in turn connect to the Internet core 102 by connecting to one of the core routers 104a-h. In this manner, the edge routers 106a-f may connect to any other edge router 106a-f via one or more of the edge routers 106a-f and one or more of the interconnected core routers 104a-104h.

The search processor described herein may reside in any of the core routers 104a-h, edge routers 106a-f, or access routers 108a-e. The search processor described herein, within each of these routers, is configured to analyze Internet protocol (IP) packets based on a set of rules and forward the IP packets along an appropriate network path.

Figure 2A:
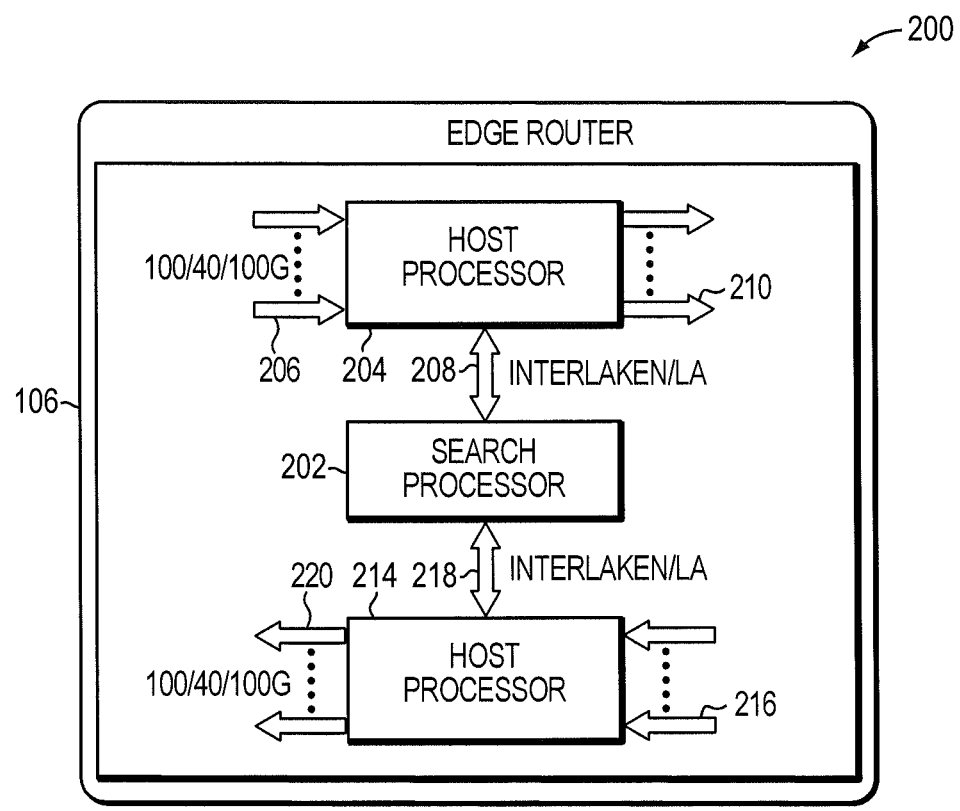
FIGS. 2A-2C show block diagrams illustrating example embodiments of routers employing a search processor.

FIG. 2A is a block diagram illustrating an example embodiment of an edge router 106 employing a search processor 202. The edge router 106, such as a service provider edge router, includes the search processor 202, a first host processor 204 and a second host processor 214. Examples of the first host processor include processors such as a network processor unit (NPU), a custom application-specific integrated circuit (ASIC), an OCTEON® processor available from Cavium, Inc., or the like. The first host processor 204 is configured as an ingress host processor. The first host processor 204 receives ingress packets 206 from a network. Upon receiving a packet, the first host processor 204 forwards a lookup request including a packet header, or field, from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. Examples of the second host processor include processors such as a NPU, a custom ASIC, an OCTEON processor, or the like. The second host processor 214 receives egress packets 216 to send to the network. The second host processor 214 forwards a lookup request with a packet header, or field, from the egress packets 216 to the search processor 202 over a second Interlaken interface 218. The search processor 202 then processes the packet header using a plurality of rule processing engines employing a plurality of rules to determine a path to forward the packets on the network. The search processor 202 forwards the processed ingress packets 220 from the host processor 214 to another network element in the network.

Figure 2B:
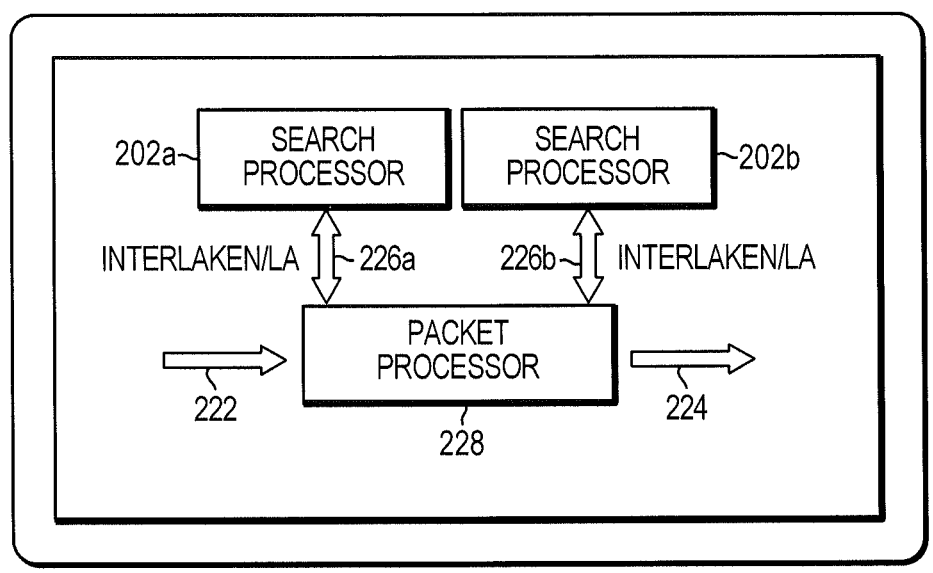

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The search processors 202a-b are coupled to a packet processor 228 using a plurality of Interlaken interfaces 226a-b, respectively. Examples of the packet processor 228 include processors such as NPU, ASIC, or the like. The plurality of search processors 202a-b may be coupled to the packet processor 228 over a single Interlaken interface. The edge router 106 receives a lookup request with a packet header, or fields, of pre-processed packets 222 at the packet processor 228. The packet processor 228 sends the lookup request to one of the search processors 202a-b. The search processor, 202a or 202b, searches a packet header for an appropriate forwarding destination for the pre-processed packets 222 based on a set of rules and data within the packet header, and responds to the lookup request made by the packet processor 228. The packet processor 228 then sends the post processed packets 224 to the network based on the response to the lookup request from the search processors 202a or 202b.

Figure 2C:
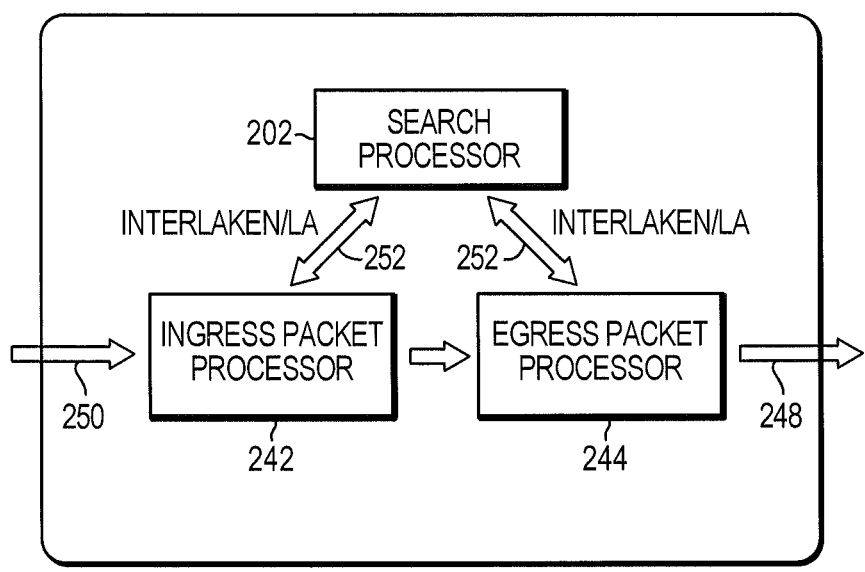

FIG. 2C is a block diagram 240 illustrating an example embodiment of an access router 246 employing the search processor 202. The access router 246 receives an input packet 250 at an ingress packet processor 242. Examples of the ingress packet processor 242 include OCTEON processor, or the like. The ingress packet processor 242 then forwards a lookup request with a packet header of the input packet 250 to the search processor 202. The search processor 202 determines, based on the packet header in the lookup request, a forwarding path for the input packet 250 and responds to the lookup request over the Interlaken interface 252 to the egress packet processor 244. The egress packet processor 244 then outputs the forwarded packet 248 to the network.

Figure 3:
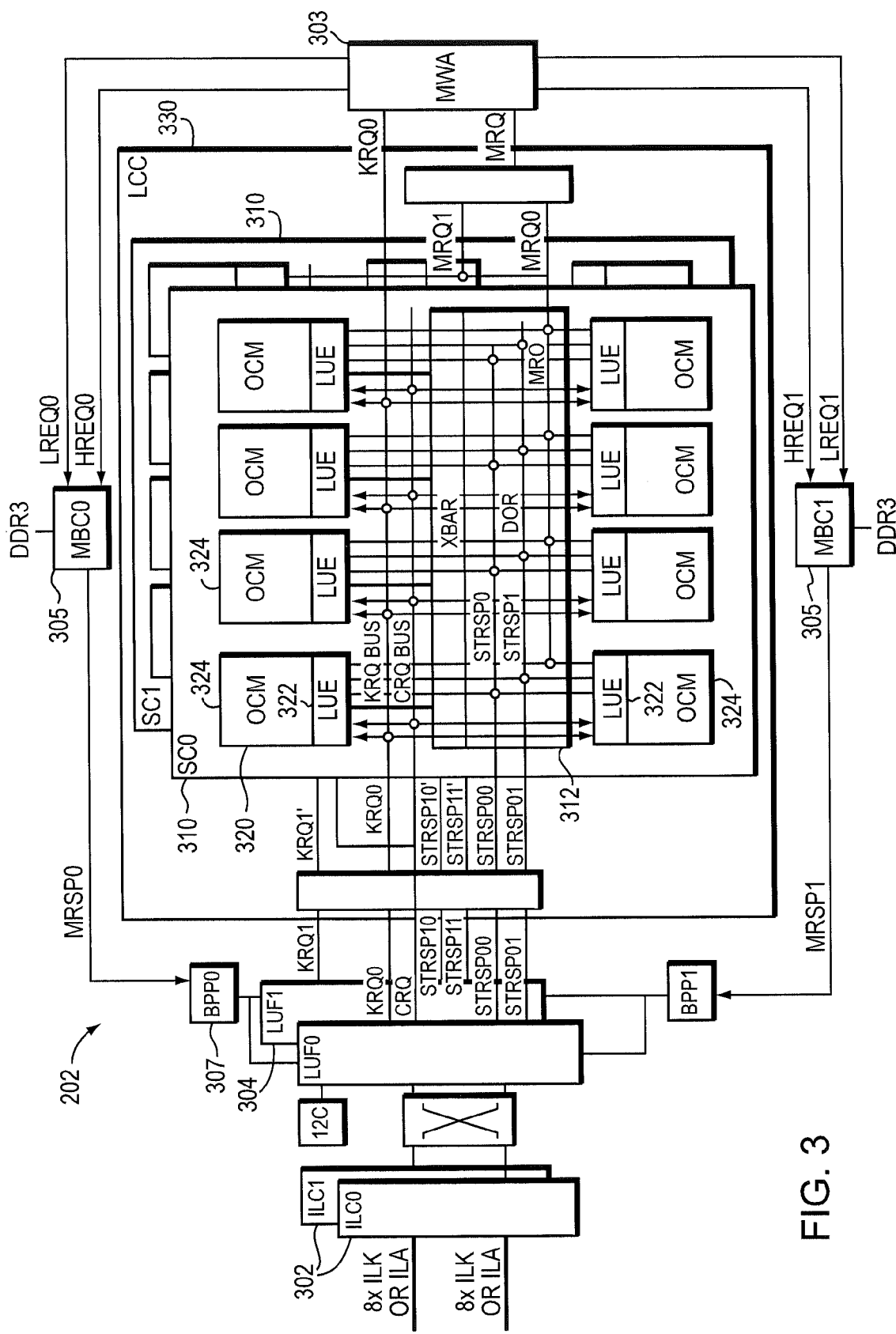
FIG. 3 shows an example architecture of a search processor.

FIG. 3 shows an example architecture of a search processor 202. The processor includes, among other things, an interface, e.g., Interlaken LA interface, 302 to receive requests from a host processor, e.g., 204, 214, 228, 242, or 244, and to send responses to the host processor. The interface 302 is coupled to Lookup Front-end (LUF) processors 304 configured to process, schedule, and order the requests and responses communicated from or to the interface 302. According to an example embodiment, each of the LUF processors is coupled to one of the super clusters 310. Each super cluster 310 includes one or more memory clusters, or search clusters, 320. Each of the memory, or search, clusters 320 includes a Lookup Engine (LUE) component 322 and a corresponding on-chip memory (OCM) component 324. A memory, or search, cluster may be viewed as a search block including a LUE component 322 and a corresponding OCM component 324. Each LUE component 322 is associated with a corresponding OCM component 324. A LUE component 322 includes processing engines configured to search for rules in a corresponding OCM component 324, given a request, that match keys for packet classification. The LUE component 322 may also include interface logic, or engine(s), configured to manage transport of data between different components within the memory cluster 320 and communications with other clusters. The memory clusters 320, in a given super cluster 310, are coupled through an interface device, e.g., crossbar (XBAR 312). The XBAR 312 may be viewed as an intelligent fabric enabling coupling LUF processors 304 to different memory clusters 320 as well as coupling between different memory clusters 320 in the same super cluster 310. The search processor 202 may include one or more super clusters 310. A lookup cluster complex (LCC) 330 defines the group of super clusters 310 in the search processor 202.

The search processor 202 may also include a memory walker aggregator (MWA) 303 and at least one memory block controller (MBC) 305 to coordinate read and write operations from/to memory located external to the processor. The search processor 202 may further include one or more Bucket Post Processors (BPPs) 307 to search rules, which are stored in memory located external to the search processor 202, that match keys for packet classification.

Figure 4:
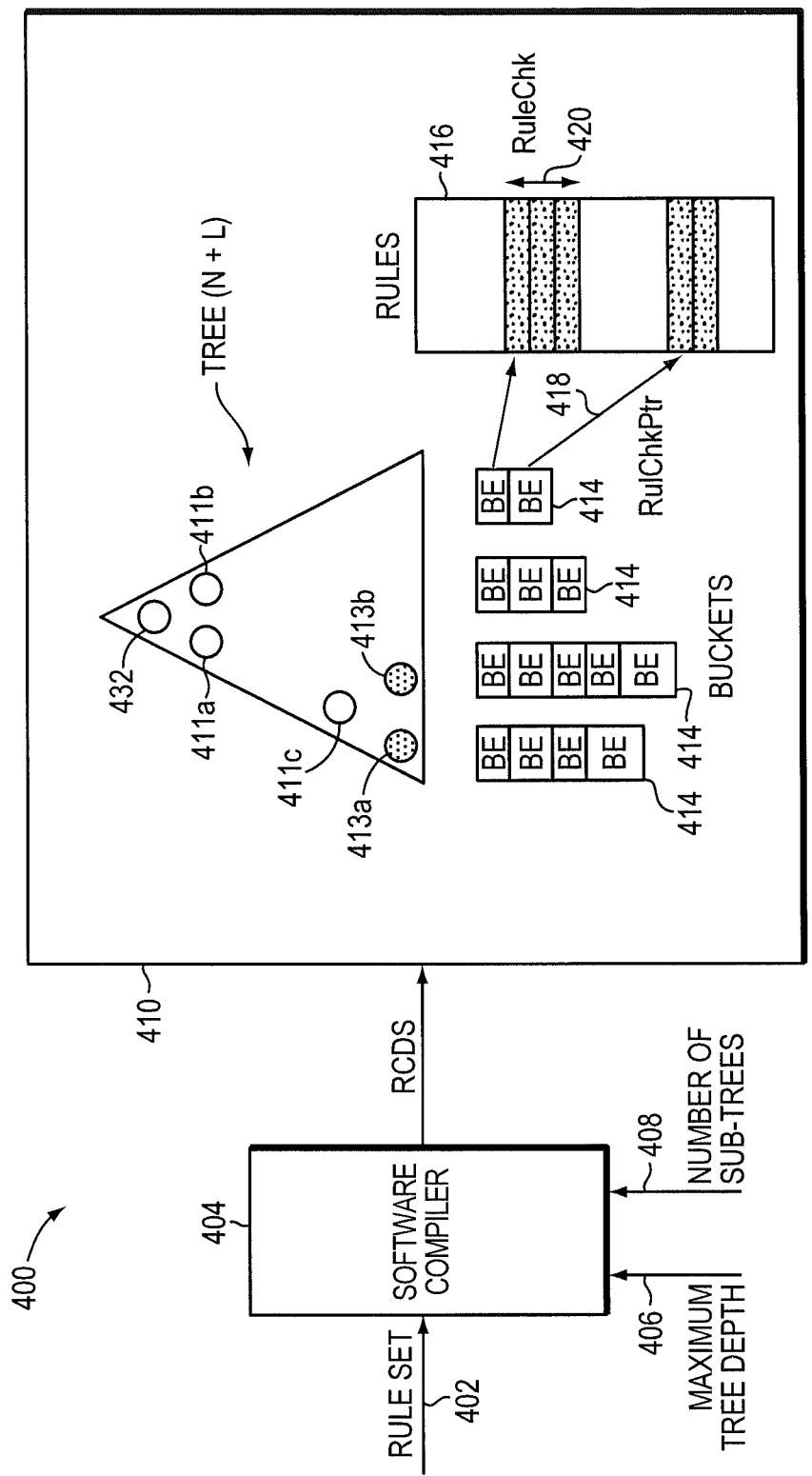
FIG. 4 is a block diagram illustrating an example embodiment of loading rules, by a software compiler, into an on-chip memory (OCM)

FIG. 4 is a block diagram 400 illustrating an example embodiment of loading rules, by a software compiler, into OCM components. According to an example embodiment, the software compiler 404 is software executed by a host processor or control plane processor to store rules into the search processor 202. Specifically, rules are loaded to at least one OCM component 324 of at least one memory cluster, or search block, 320 in the search processor 202. According to at least one example embodiment, the software compiler 404 uses multiple data structures, in storing the rules, in a way to facilitate the search of the stored rules at a later time. The software compiler 404 receives a rule set 402, parameter(s) indicative of a maximum tree depth 406 and parameter(s) indicative of a number of sub-trees 408. The software compiler 404 generates a set of compiled rules formatted, according to at least one example embodiment, as linked data structures referred to hereinafter as rule compiled data structure (RCDS) 410. The RCDS is stored in at least one OCM component 324 of at least one memory cluster, or search block, 320 in the search processor 202. The RCDS 410 includes at least one tree 412. Each tree 412 includes nodes 411a-411c, leaf nodes 413a-413b, and a root node 432. A leaf node, 413a-413b, of the tree 412 includes, or points to, one of a set of buckets 414. A bucket 414 may be viewed as a sequence or array of bucket entries, each bucket entry storing a pointer or an address, referred to hereinafter as a chunk pointer 418, of a chunk of rules 420. Buckets may be implemented, for example, using tables, linked lists, or any other data structures known in the art adequate for storing a sequence of entries. A chunk of rules 420 is basically a chunk of data describing or representing one or more rules. In other words, a set of rules 416 stored in one or more OCM components 324 of the search processor 202 includes one or more chunks of rules 420. A chunk of rules 420 may be a sequential group of rules, or a group of rules scattered throughout the memory, either organized by a plurality of pointers or by recollecting the scattered chunk of rules 420, for example, using a hash function.

The RCDS 410 described in FIG. 4 illustrates an example approach of storing rules in the search engine 202. A person skilled in the art should appreciate that other approaches of using nested data structures may be employed. For example, a table with entries including chunk pointers 418 may be used instead of the tree 412. In designing a rule compiled data structure for storing and accessing rules used to classify data packets, one of the factors to be considered is enabling efficient and fast search or access of such rules.

Once the rules are stored in the search processor 202, the rules may then be accessed to classify data packets. When a host processor receives a data packet, the host processor forwards a lookup request with a packet header, or one or more fields, from the data packet to the search processor 202. On the search processor side, a process of handling the received lookup request includes:

1) The search processor receives the lookup request from the host processor. According to at least one example embodiment, the lookup request received from the host processor includes a packet header and a group identifier (GID).
2) The GID indexes an entry in a global definition/description table (GDT). Each GDT entry includes n number of table identifiers (TID), a packet header index (PHIDX), and key format table index (KFTIDX).
3) Each TID indexes an entry in a tree location table (TLT). Each TLT entry identifies which lookup engine or processor will look for the one or more matching rules. In this way, each TID specifies both who will look for the one or more matching rules and where to look for the one or more matching rules.
4) Each TID also indexes an entry in a tree access table (TAT). TAT is used in the context in which multiple lookup engines, grouped together in a super cluster, look for the one or more matching rules. Each TAT entry provides the starting address in memory of a collection of rules, or pointers to rules, called a table or tree of rules. The terms table of rules or tree of rules, or simply table or tree, are used interchangeably hereinafter. The TID identifies which collection or set of rules in which to look for one or more matching rules.
5) The PHIDX indexes an entry in a packet header table (PHT). Each entry in the PHT describes how to extract n number of keys from the packet header.
6) The KFTIDX indexes an entry in a key format table (KFT). Each entry in the KFT provides instructions for extracting one or more fields, e.g., parts of the packet header, from each of the n number of keys, which were extracted from the packet header.
7) Each of the extracted fields, together with each of the TIDs are used to look for subsets of the rules. Each subset contains rules that may possibly match each of the extracted fields.
8) Each rule of each subset is then compared against an extracted field. Rules that match are provided in responses, or lookup responses.

The handling of the lookup request and its enumerated stages, described above, are being provided for illustration purposes. A person skilled in the art should appreciate that different names as well as different formatting for the data included in a look up request may be employed. A person skilled in the art should also appreciate that at least part of the data included in the look up request is dependent on the design of the RCDS used in storing matching rules in a memory, or search, cluster 320.

Figure 5:
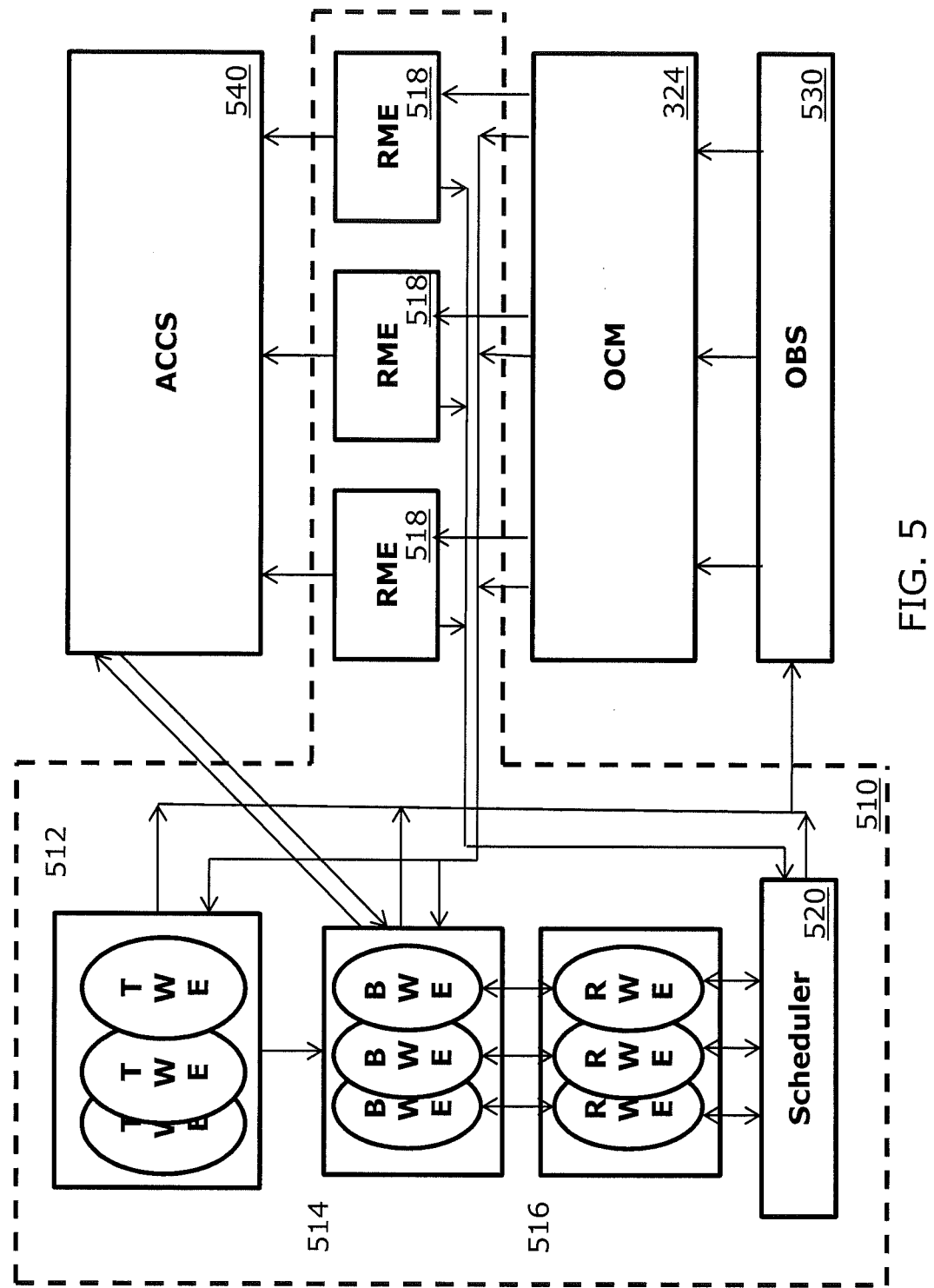
FIG. 5 shows a block diagram illustrating the architecture of a memory, or search, cluster according to at least one example embodiment.

FIG. 5 shows a block diagram illustrating the architecture of a memory, or search, cluster 320 according to at least one example embodiment. The memory, or search, cluster 320 includes an on-chip memory (OCM) component 324 configured to store and provide access to data associated with the RCDS 410. The OCM component 324 includes one or more memory banks. The distribution of the data associated with the RCDS 410 among different memory banks may be done in different ways. For example, different data structures, e.g., the tree data structure(s), the bucket data structure(s), and the chunk of rules data structure(s), may be stored in different memory banks. Alternatively, a single memory bank may store data associated with more than one data structure. For example, a given memory bank may store a portion of the tree data structure, a portion of the bucket data structure, and a portion of the chunk rule data structure.

The memory, or search, cluster 320 includes a plurality of processing engines 510 including, for example, one or more tree walk engines (TWE) 512, one or more bucket walk engines (BWE) 514, a plurality of rule walk engines (RWE) 516, and multiple rule matching engines (RME) 518. According to an example implementation, the memory, or search, cluster 320 includes eight BWEs 514, eight corresponding RWEs 516, and three RMEs 518. A person skilled in the art should appreciate that the memory, or search, cluster 320 may be designed to include different numbers of BWEs 514, RWEs 516, or RMEs 518. According to at least one example embodiment, the BWE 514 and RWE 516 may be combined into a single processing engine performing both bucket and rule chunk data searches. According to an example embodiment the RWEs 516 and the RMEs 518 may be separate processing engines. According to another example embodiment, the access and retrieval of rule chunks 420 may be performed by the RMEs 518 which also performs rule matching. In other words, the RMEs and the RWEs may be the same processors.

When the search processor 202 receives a request, called a lookup request, from the host processor, the LUF processor 304 processes the lookup request into one or more key search requests, each of which has a key 502. The LUF processor 304 then schedules the key requests to the memory or search cluster 320. The search cluster 320 receives, at a TWE 512, a key 502 from the LUF processor 304. The key 502 represents, for example, a field extracted from a packet header. The TWE 512 may further receive an indication of a specific tree 412 to be traversed, especially, if the RCDS 410 includes multiple trees. The TWE 512 is configured to walk or traverse the tree 412 stored in the OCM component 324. In response to the tree walk, a pointer to a bucket is passed from the OCM component 324 to a BWE 514 either directly or through the TWE 512. The BWE 514 is configured to walk or search buckets 414 in the OCM component 324. In response to the bucket search, bucket entries are sent from the OCM component 324 to the BWE 514, which passes the bucket entries to a respective RWE 516. Alternatively, the bucket entries may be sent directly from the OCM component 324 to the RWE 516. In another example, the RWEs 516 may be part of, or components of, the respective BWEs 514. A RME 518 is configured to determine whether the packet header field included in the key matches any rules associated with rule chunk data 420 pointed to by the pointer 418 in one of the bucket entries provided to the RWE 516.

A person skilled in the art should appreciate that the RCDS 410 may be implemented based on a different nested data structure including at least a first-type data structure and a second-type data structure. The first-type data structure may be a tree, table, linked list, or the like. Similarly, the second-type data structure may also be a tree, table, linked list, or the like. For example, one or more tables may be employed instead of the trees 412 shown in FIG. 4. Also, instead of the buckets 414 in the RCDS 410, a different data structure such as linked lists, trees, tables, or the like may be used. As such, a TWE 512 is an engine configured to search a first-type data structure in the nested data structure, for example, to search for a respective first entry based on the key. The first entry is, for example, indicative of a memory location of a second-type data structure, e.g., a bucket, in the nested data structure. The BWE 514, in a general sense, represents an engine configured to search the second-type data structure of the nested data structure.

According to at least one example embodiment, the memory, or search, cluster 320 also includes a scheduler or arbiter module 520, an OCM bank slotter (OBS) module 530, and an accumulator scoreboard (ACCS) module 540. The memory, or search, cluster 320 may further include other components or modules which are not described herein. The scheduler or arbiter module 520, also referred to as rule walk cluster arbiter RWCARB, is configured to schedule execution of rule matching threads initiated by the plurality of RWEs 516 or BWEs 514. The rule matching threads are processed by the multiple RMEs 518 to determine whether fields included in the key match any rules associated with rule chunk data 420 pointed to by the pointers 418 in the bucket entries provided to the RWEs 516 or BWEs 514. According to at least one example embodiment, in scheduling execution of rule matching threads, the scheduler or arbiter module 520 is configured to minimize processing time associated with execution of rule matching threads.

RCDS data access requests from the TWEs 512, the BWEs 514, or the RWEs 516 are sent to the OBS module 530. According to at least one example embodiment, the OBS module 530 is coupled to the memory banks in the OCM component 324 through a number of logical, or access, ports. The number of the access ports enforce constraints on the number of data access requests that may be executed, or the number of memory banks that may be accessed, at a given clock cycle. The OBS module 530 is configured to determine the data access requests to be forwarded to memory banks of the OCM component 324 at each clock cycle. The OBS module 530 attempts to maximize OCM usage while avoiding memory bank conflict and providing low latency for data access requests. Memory bank conflict occurs, for example, when attempting to access a memory bank by more than one data access request at a given clock cycle. Low latency is usually achieved by preventing access requests from waiting for a long time in the OBS module 530 before being forwarded to respective memory banks.

According to at least one example embodiment, the ACCS 540 is configured to manage results of rule matching threads generated by the RMEs 518 and determine a final result for reporting to a host processor, e.g., 204, 214, 228, 242, or 244. The ACCS 540 is also configured to report that the final result is determined to a respective BWE 514 or RWE 516.

Figure 6A:
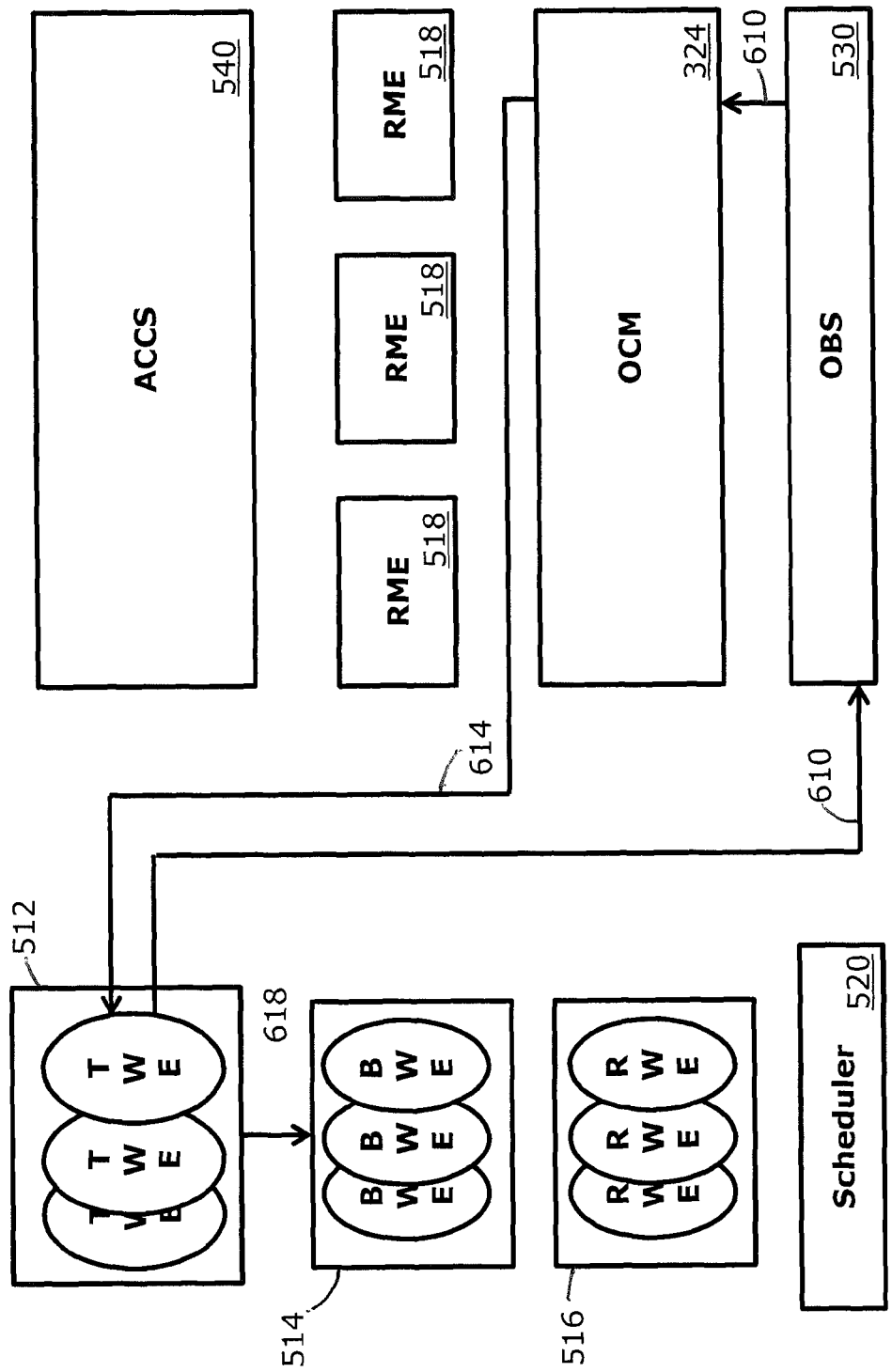
FIGS. 6A-6C are flow diagrams illustrating different stages associated with processing a key search thread.
Figure 6B:
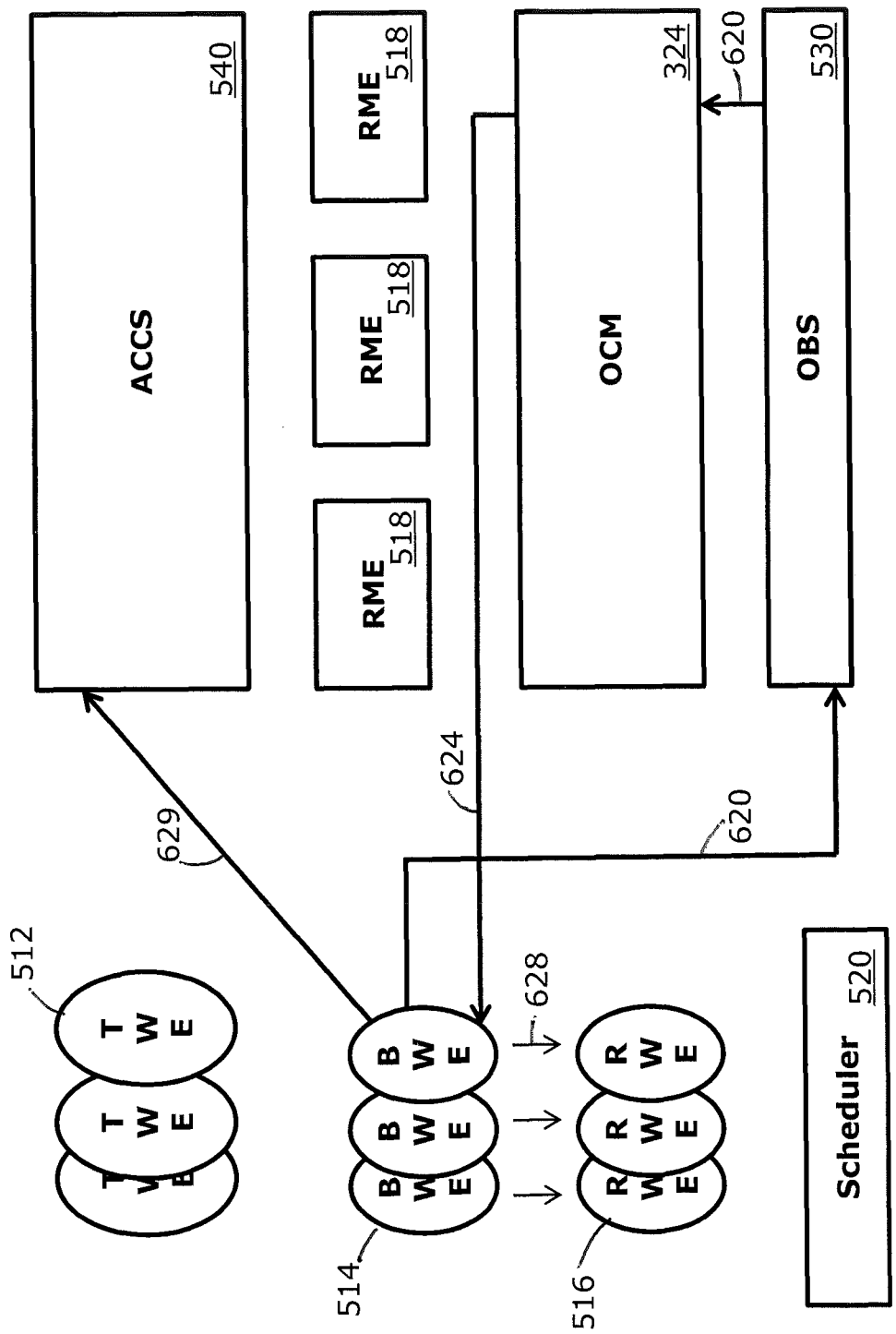
Figure 6C:
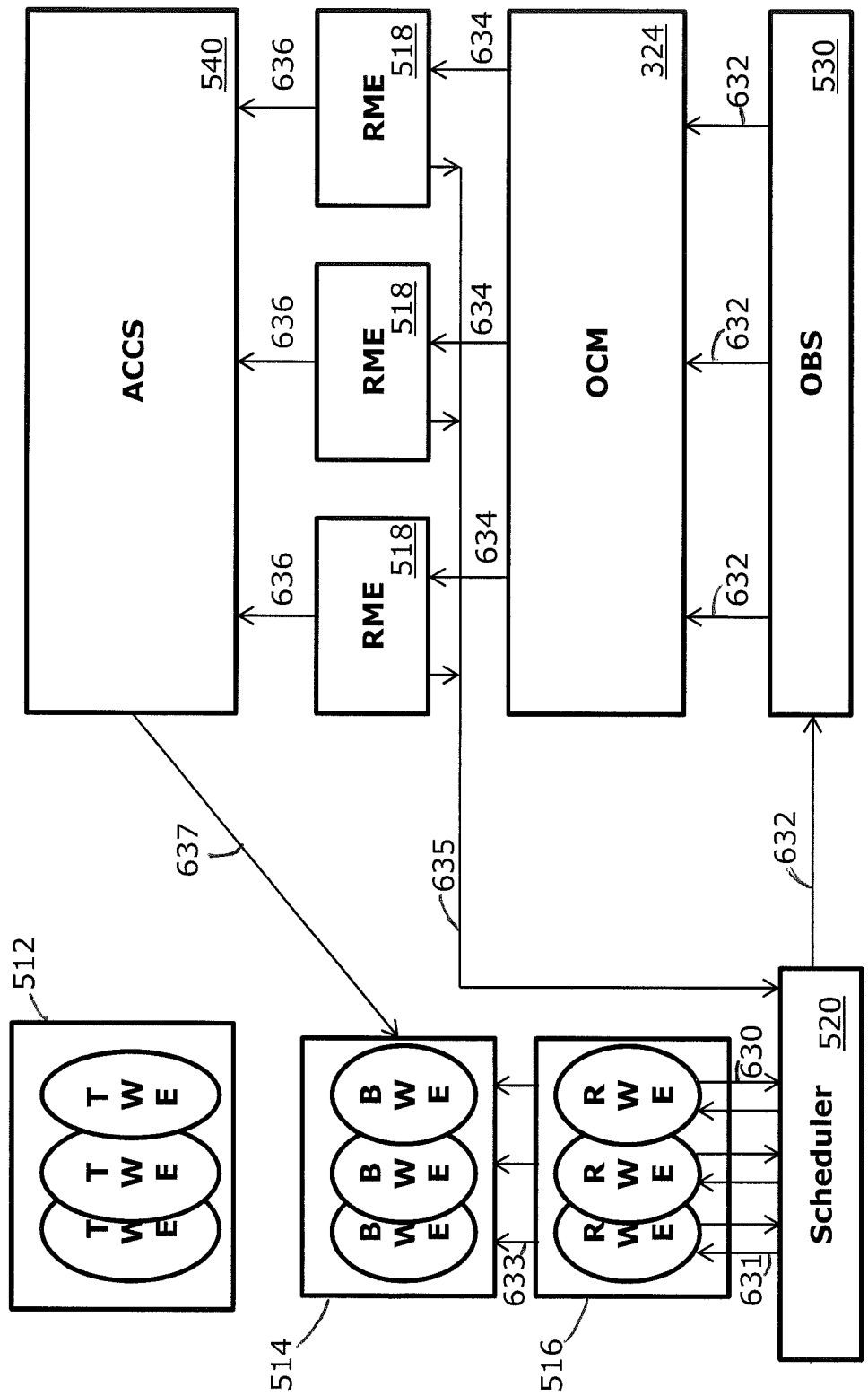

FIGS. 6A-6C are block diagrams illustrating processing flows associated with different stages of processing a key search thread within the search or memory cluster 320. The LUF processor 304 sends a key search request 502 to the memory or search cluster 320. A key search request 502 includes a key. The key represents, for example, a field extracted from a packet header. The key search request may further include an indication of a specific tree 412 to be searched, especially, if the RCDS 410 includes multiple trees.

As shown in FIG. 6A, a key search thread starts in a TWE 512 according to at least one example embodiment. The TWE receiving the key search request from the LUF processor 304 sends a tree walk request 610 to the OCM component 324 through the OBS module 530. The tree walk request is a request to read data associated with a specific tree stored in the OCM component 324. According to an example embodiment, the tree walk request includes an indication of a path to be traversed in the specific tree 412. Such indication is, for example, defined within the key. In the OCM component 324, the data associated with the indicated path is read. The path may end in a leaf node, e.g., 413a or 413b or may end before reaching a leaf node, e.g., at an interior node such as 411a, 411b, or 411c. A leaf node, 413a-413b, of the tree 412 usually includes a pointer to, or an address of, a bucket 414 and value indicative of a number of bucket entries (BEs) in the respective bucket. However, a leaf node, 413a-413b, may include no information about a bucket, e.g., no address and no number value. In the case the traversed path ends with a leaf node, e.g., 413a or 413b, which includes information related to a bucket, a leaf node response 614 is sent back to the TWE 512. The leaf node response 614 includes the pointer to, or address of, the bucket and the number value. The bucket pointer and the number value are then passed 618 from the TWE 512 to a BWE 514. Alternatively, the leaf node response 614 may be sent directly to the respective BWE 514 from the OCM component 324.

FIG. 6B is a block diagram illustrating processing flow associated with a bucket walk thread. The BWE 514 issues a bucket-data request 620 to access buckets 414 in the OCM component 324 and receive corresponding responses. The bucket-data request 620 includes, for example, the bucket pointer or address and the number value provided in the leaf node response 614. The bucket-data request 620 is sent from the BWE 514 to the OCM component 324 through the OBS 530. The bucket entries, indicated by the bucket address or pointer and the respective number of entries, are retrieved and sent in a bucket response 624 from the OCM component 324 to the BWE 514. The bucket entries are then presented 628 by the BWE 514 to an RWE 516 associated with the BWE 514. Alternatively, the bucket response 624 is sent directly from the OCM component 324 to the respective RWE 516. The RWE 516 may also be implemented as a component of the BWE 514. A bucket response 624 includes one or more bucket entries.

A bucket response 624 may contain, for example, 8 bucket entries. The 8 bucket entries include, for example, one bundle having 3 bucket entries and another having 5 entries. Alternatively, the bucket response 624 may contain a single bundle with 8 bucket entries. According to one example scenario, the bundles may be already defined at the leaf nodes. According to another example scenario, the bundles may be defined by the BWE 514. The search engine software, for example, may send configuration information defining the bundles to the BWEs or the trees. When the bundle of bucket entries is presented to the RWE 516, the BWE 514 notifies 629 the ACCS 540 of the number of bucket entries in the bundle. According to an example embodiment, a bundle of bucket entries includes one to eight entries. According to another example embodiment, a bundle of bucket entries includes one to sixteen bucket entries.

FIG. 6C is a flow chart illustrating initiation and processing flow of a rule matching thread. The RWE 516 is configured to forward 630 the bundle of bucket entries, received from the respective BWE 514, to the scheduler or arbiter module 520. Each bucket entry includes a rule chunk pointer 418 pointing to a rule chunk 420 describing a rule. The rules associated with the bundle of bucket entries are to be evaluated, based on one or more fields from the key, by the RMEs 518 to check whether the key fields satisfy any of the rules associated with the bundle of bucket entries. As such, sending a bundle of bucket entries from the RWE 516 or the BWE 514 to the scheduler or arbiter module 520 represents an initiation of a bundle of rule matching threads.

When the BWE 514 receives the bucket entries, the key, or key information, is sent to a memory or buffer accessible to the RME 518. The key or key information is, for example, indexed by a BWE 514 number or index. When a rule chunk 420 arrives at the RME 518 for processing, context information sent along with the rule chunk tells the RME 518 which BWE 514 the rule chunk 420 is for. The RME 518 uses this BWE number or index to notify the ACCS 540 of a "match" or "non-match", but also to fetch the key from the buffer for comparing against the rule chunk 420.

The scheduler or arbiter module 520 is configured to receive bundles of bucket entries from different RWEs 516, or BWEs 514, and schedule the respective rule matching threads for processing by the RMEs 518. The scheduler or arbiter module 520 assigns and passes or sends rule matching threads to the RMEs 518. According to at least one example implementation, the scheduler or arbiter module 520 is capable of sending more than one rule matching thread per clock cycle. In passing a rule matching thread to an assigned RME 518, the scheduler or arbiter module 520 is configured to send a respective rule chunk request 634 to the OCM component 324 through the OBS 530. According to at least one example embodiment, upon sending a rule chunk request 634, the scheduler or arbiter module 520 sends a notification 631 to the respective RWE 516. The RWE 516 notifies 633 the BWE 514 when all rule matching threads within the bundle have been sent by the scheduler or arbiter module 520. The notification 633 from the RWE 516 to the BWE 514 allows the BWE 514 to present more bucket entries, associated with another bucket thread or request, to the RWE 516. When the RWE 516 presents a given bundle of bucket entries to the scheduler or arbiter module 520, the same RWE 516 may not present another bundle to the scheduler or arbiter module 520 till all the respective rule chunk requests 632 corresponding to the given bundle are processed by the scheduler or arbiter module 520 and sent to the module OBS 530. A rule chunk request 632 sent from the scheduler 520 to the OBS 530 includes, for example, a starting address of the data to be read and an indication of the amount of data to be read, e.g., a number of consecutive addresses.

The rule chunk request 632 includes the rule chunk pointer 418, from the respective bucket entry, referencing a respective rule chunk 420. The rule chunk request 632 is forwarded by the OBS 530 to the OCM component 324. The OBS 530 may forward the rule chunk request 632 as multiple sub-requests each for reading a single memory line, for example, At the OCM component 324, the rule chunk 420 indicated by the rule chunk pointer 418, associated with the rule matching thread, is retrieved and then forwarded 634 to a respective RME 518 to which it was assigned by the scheduler or arbiter module 520. The assigned RME 518 checks whether the rule represented by the received rule chunk 420 is satisfied by field(s) in the key. The assigned RME 518 processes the rule chunk 420 and reports a "match" or "no-match" result to the ACCS 540. The assigned RME 518 may also report an "error" to the ACCS 540 in case an error occurs during the processing of the rule matching thread. Upon processing the rule chunk 420 and reporting 636 a result to the ACCS 540, the assigned RME may also send a notification 635 to the scheduler or arbiter module 520 indicating that the rule matching thread is processed.

A rule chunk 420, associated with a respective rule chunk request 632, is entirely presented to the RME 518 and may not be distributed among more than one RME 518. According to at least one scenario, interleaving of data chunks presented to a particular RME 518 is not allowed. The amount of data associated with data chunks 420 may vary from one data chunk to another. The processing time of a rule matching thread by the RME 518 also varies based on the size of the respective rule chunk 420. For example, data chunks 420 with more data lines take longer time to be processed by the respective RMEs 518. According to at least one scenario, the RMEs 518 in the memory, or search, cluster 320 are of equivalent functionality and equally-capable of processing rule matching threads. In other words, the RMEs 518 have equal processing capabilities.

The ACCS is configured to gather the responses 636 for all the rule matching threads within the respective bundle and determine a final result for the bundle. Upon determining a final result, the ACCS 540 is configured to send a notification 637 to the respective BWE 514 indicating that the bundle has been fully processed and including the final result, e.g., "error," "match," or "non-match." Upon receiving a response 637, the BWE 514 decides how to proceed. If the response is indicative of a "non-match", the BWE 514 initiates another bucket request 620 to fetch bucket entries from the OCM component 324. If the response is indicative of an "error, the BWE 514 will stop reading additional bucket entries and return "no-match" to the LUF. This process continues until a "match" is found by an RME 518, an "error" is indicated by an RME 518, or the BWE 514 has exhausted the number of bucket entries indicated in the leaf node, e.g., 413a and 413b. That is, if at some point the BWE 514 receives a response indicative of a "match", it stops initiating new rule chunk searches and waits for any outstanding rule matching threads to complete processing. If the response is indicative of a "non-match," the BWE 514 continues reading bucket entries and initiating more rule searches.

If at some point the BWE 514 receives a response indicative of a "match," it stops initiating new rule searches and waits for any outstanding rule searches to complete processing. Then, the BWE 514 provides, or causes the ACCS 540 to provide, a response to the host processor through the LUF processor 304, indicating that there is a "match" between the key field(s) and one or more rules in the retrieved rule chunk(s). If the BWE 514 exhausts all bucket entries in the bucket without receiving any "match" response, the BWE 514 reports, or causes reporting of, a response to the host processor through the LUF processor 304 indicating that there is no match.

The notification 635 allows the scheduler or arbiter module 520 to keep track of the availability status of the RMEs 518. According to at least one example embodiment, the scheduler 520 maintains indications of the statuses of the buffers associated with the RMEs 518. Such indications may be described in terms of memory units referred to hereinafter as credits. Given a number of credits C indicative of the memory capacity of a given RME 518, the scheduler 520 is configured to decrements C by a number of credits n, representing the size of a rule chunk 420, when a respective rule matching thread is sent toward the given RME 518. At this stage the memory capacity of the given RME is C-n. When the given RME 518 is done processing the rule matching thread, it signals the number of credits n back to the scheduler 520 in the notification 635 and the scheduler 520 increments the credits by n.

Figure 7A:
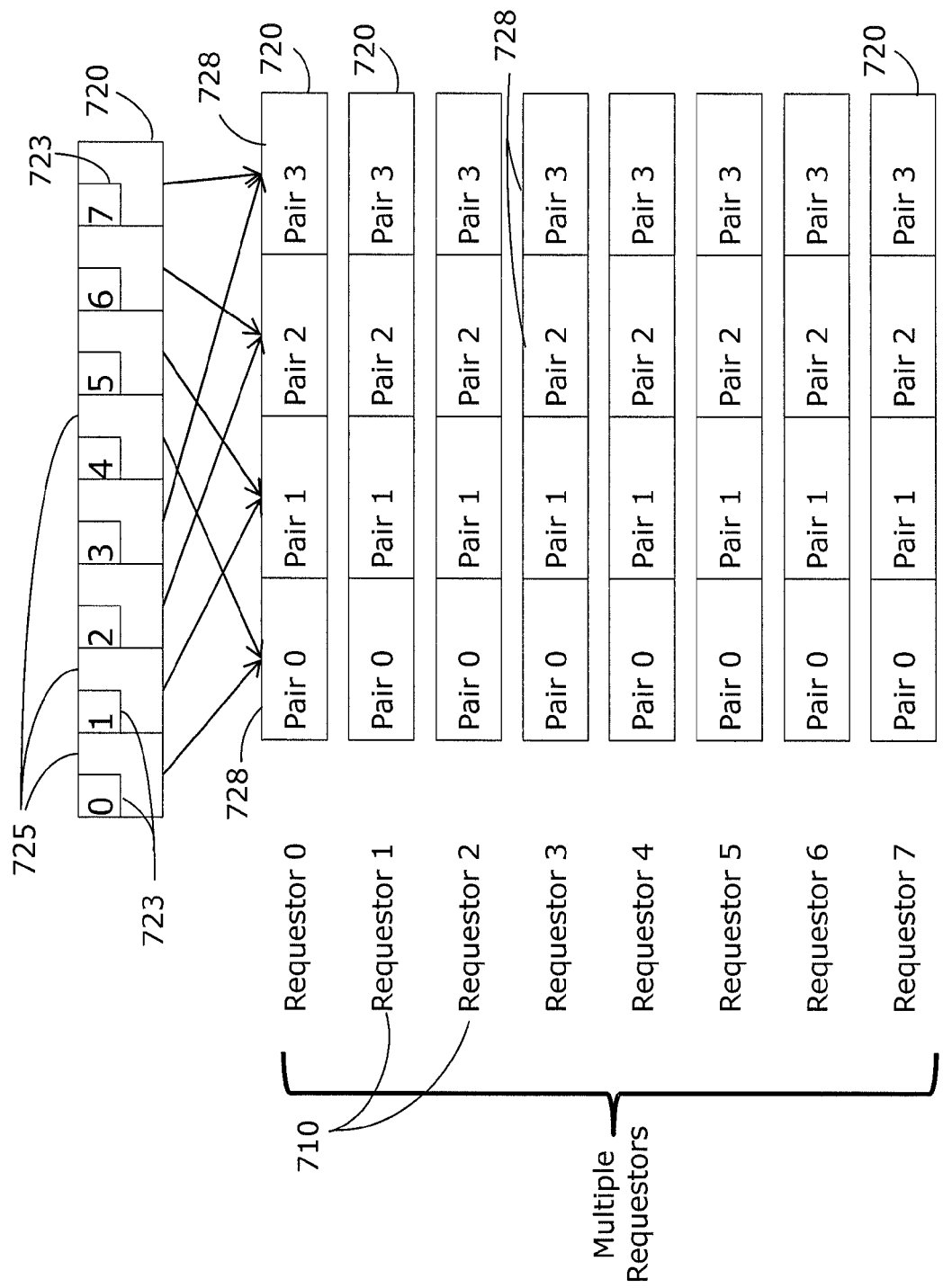
FIGS. 7A and 7B are block diagrams illustrating scheduling of bundles of rule matching threads within the scheduler or arbiter module, according to at least one example embodiment.
Figure 7B:
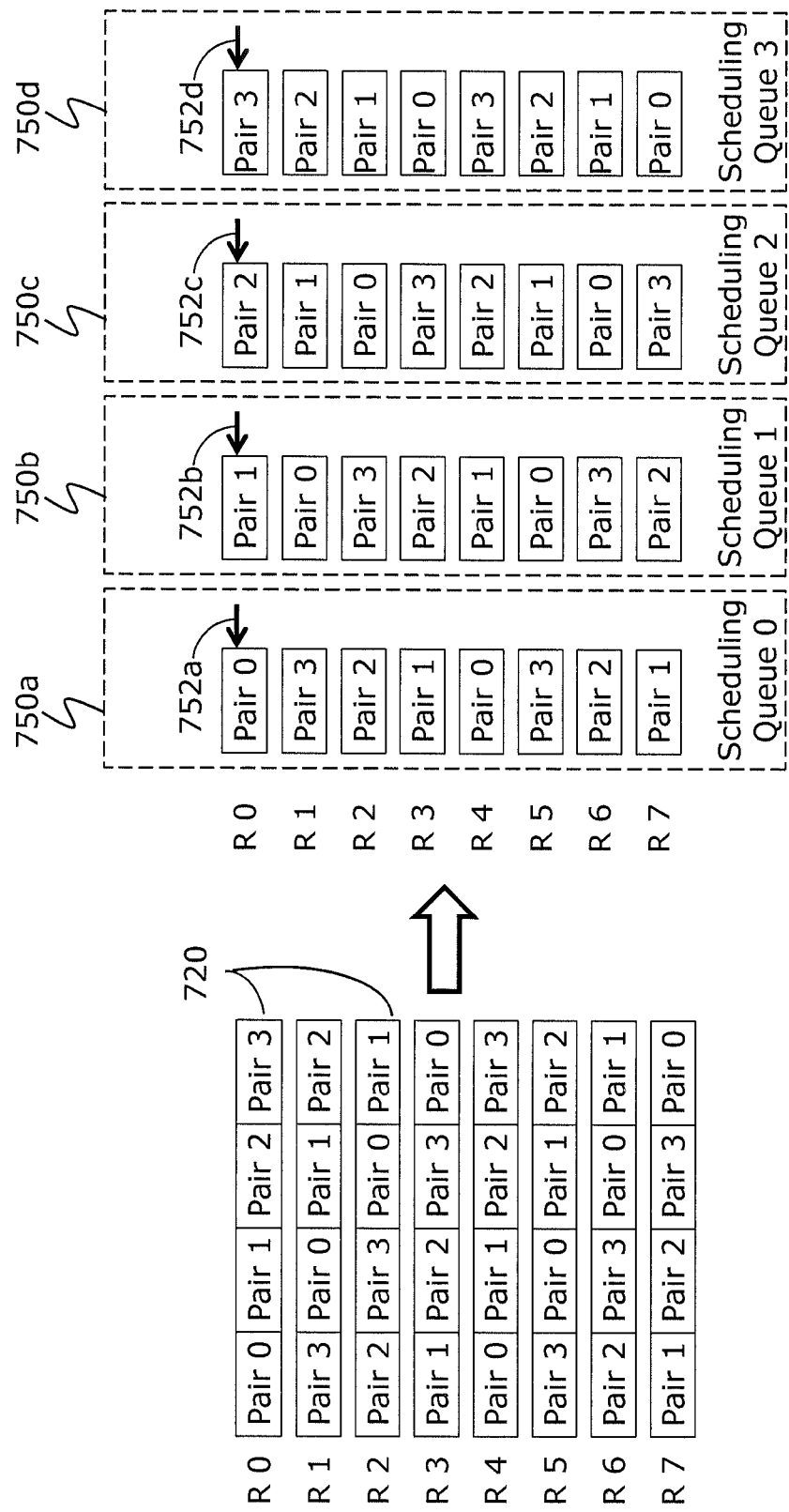

FIGS. 7A and 7B are block diagrams illustrating scheduling of bundles of rule matching threads 725 in the scheduler or arbiter module 520, according to at least one example embodiment. As shown in FIG. 7A, rule matching threads 725, in each bundle 720 of rule matching threads, are assigned priority values 723. The priority value 723 of a given rule matching thread 725 is indicative of the relative priority of given rule matching thread 725 compared to other threads in the same bundle. In determining a final result for the bundle 720, at the ACCS 540, the priority values 723 of respective rule matching threads 725 are taken into consideration. For example, the final result may be determined as the matching result of a given rule matching thread with highest priority among the rule matching threads in the bundle with matching results equal to "match" or "error." In the implementation shown in FIG. 7A, the lower the priority value 723, the higher is the priority of the respective rule matching thread 725. For example, the rule matching thread with priority value 0 has the highest priority in the bundle 720. A person skilled in the art should appreciate that other implementations may be employed where, for example, a higher priority value is indicative of a higher priority.

As shown in FIG. 7A, the rule matching threads 725 in each respective bundle 720 are distributed into a number of subgroups 728 of rule matching threads. For example, each subgroup 728 includes two rule matching threads 725 as shown in FIG. 7A. Alternatively, each subgroup 728 may include four rule matching threads 725. According to at least one example scenario, the rule matching threads 725 in a each bundle 720 are distributed among respective subgroups 728 in a way that each subgroup 728 includes rule matching threads 725, from the same bundle 720, with high and relatively low priorities. For example, the "Pair 0" includes the rule matching threads with priority values 0 and 4, whereas the "Pair 1" includes the rule matching threads with priority values 1 and 5, and so on. A person skilled in the art should appreciate that a different distribution scheme may be used. According to at least one example embodiment, the scheduler or arbiter module 520 can not have, at any time instant, more than one bundle 720 being processed or in a queue to be processed from a given requestor, or rule matching thread initiator, 710. The requestor 710 of a given rule matching thread is the processing engine that initiated the rule matching thread 725 or sent it to the scheduler. For example, the requestor 710 for given rule matching thread may be the respective BWE 514 or the respective RWE 516. A bundle priority value is assigned to each bundle 720. The bundle priority value for a given bundle 720 may be assigned, for example, based on the respective requestor 710. A person skilled in the art should appreciate that the priority values 723 may be assigned based on other criteria such as the number of requests in each bundle, the presence/absence of specific priority value(s) 723 in a bundle, or the like. FIG. 7B is a block diagram illustrating scheduling of subgroups 728 of rule matching threads in the scheduler or arbiter module 520 according to at least one example embodiment. For each bundle 720, corresponding to a respective requestor 710, the respective subgroups 728 are assigned to multiple scheduling queues 750a-d of the scheduler or arbiter module 520. According to at least one implementation scenario, the number of subgroups 728 for each bundle 720 is equal to the number of scheduling queues in the scheduler or arbiter module 520. In such a case, each subgroup 728 in a given bundle 720 is assigned to a separate scheduling queue, e.g., 750a, 750b, 750c, or 750d. Alternatively, the number of scheduling queues 750 may be smaller than or greater than the number of subgroups 728 in each bundle 720. In such a case, either more than one subgroup 728 or no subgroup 728 of a given bundle 720 may be assigned to a particular scheduling queue 750.

According to at least one example embodiment, the assignment of subgroups 728 is performed in such a way that subgroups 728 of a bundle having a higher bundle priority are assigned to the scheduling queues, e.g., 750a-d, prior to subgroups 728 of bundle having relatively lower bundle priority. For example, the eight requestors R0, . . . , R7, the bundle priorities may be defined such as the bundle corresponding to R0 has the highest bundle priority, the bundle corresponding to R1 has the second highest bundle priority, . . . , and the bundle corresponding to R7 has the lowest bundle priority. In such case, the bundle corresponding to the requestor R0 is always assigned first, followed by the bundle corresponding to the requestor R1, and so forth. Also, for a given scheduling queue, the subgroups assigned from different bundles 720 may have different indices. For example, for the bundle corresponding to the requestor R0, the subgroups "Pair 0," "Pair 1," "Pair 2," and "Pair 3" are assigned, respectively, to the scheduling queues 750a, 750b, 750c, and 750d. For the bundle corresponding to the requestor R1, however, the subgroups "Pair 3," "Pair 0," "Pair 1," and "Pair 2" are assigned, respectively, to the scheduling queues 750a, 750b, 750c, and 750d.

By changing how subgroups are assigned to the scheduling queues from one bundle to another, the rule matching threads with relatively high priority, in different bundles, are distributed among the different scheduling queues, e.g., 750a-d. Once subgroups 728 are assigned to the scheduling queues, e.g., 750a-d, the subgroups are then scheduled to be forwarded toward the RMEs 518 based on the respective bundle priorities. The scheduler pointers, e.g., 752a-d, indicate the subgroups to be forwarded, in a current or next clock cycle, in each scheduling queue, e.g., 750a-d. Also, within each subgroup, a rule matching thread with higher priority is scheduled to be forwarded prior to another rule matching thread with relatively lower priority.

According to at least one example scenario, subgroups 728 of rule matching threads 725 are constructed in a way that priority values 723 are almost evenly distributed among the subgroups 728. Also the assignment of subgroups 728 to the multiple scheduling queues, e.g., 750a-d, is rotated at each bundle 720. As such, the scheduler 520 is designed in way to enforce parallel processing of rule matching threads 725 with high priority as much as possible. For example, in FIG. 7B, the pointers 752a-d and the respective subgroups pointed to indicate that the rule matching thread with priority value 0 is being forwarded in the scheduling queue 750a, the rule matching thread with priority value 1 is being forwarded in the scheduling queue 750b, the rule matching thread with priority value 2 is being forwarded in the scheduling queue 750c, and the rule matching thread with priority value 3 is being forwarded in the scheduling queue 750d.

Figure 8A:
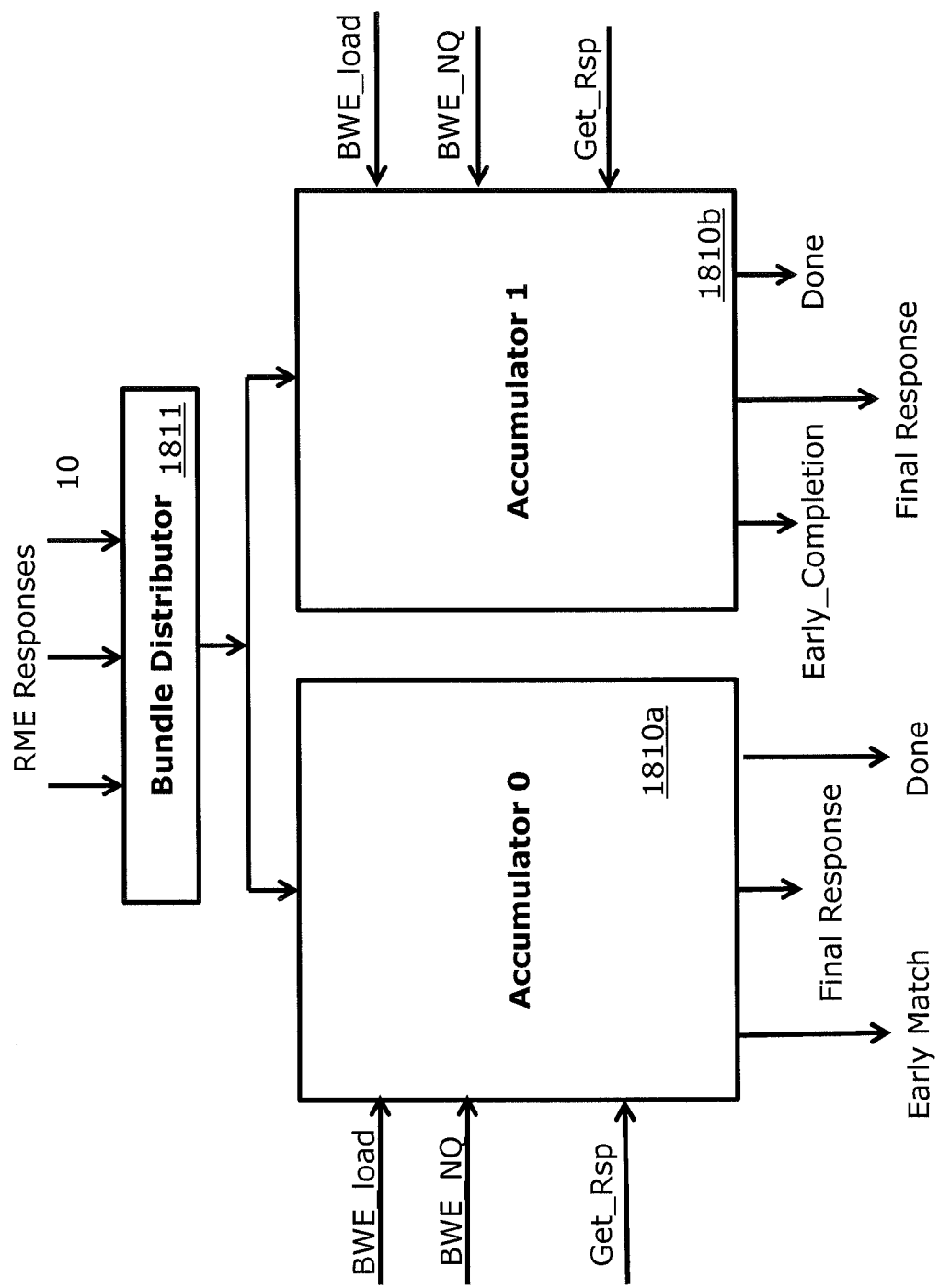
FIGS. 8A and 8B are block diagrams illustrating the architecture of a multi-bundle accumulator scoreboard (ACCS), according to an example embodiment.
Figure 8B:
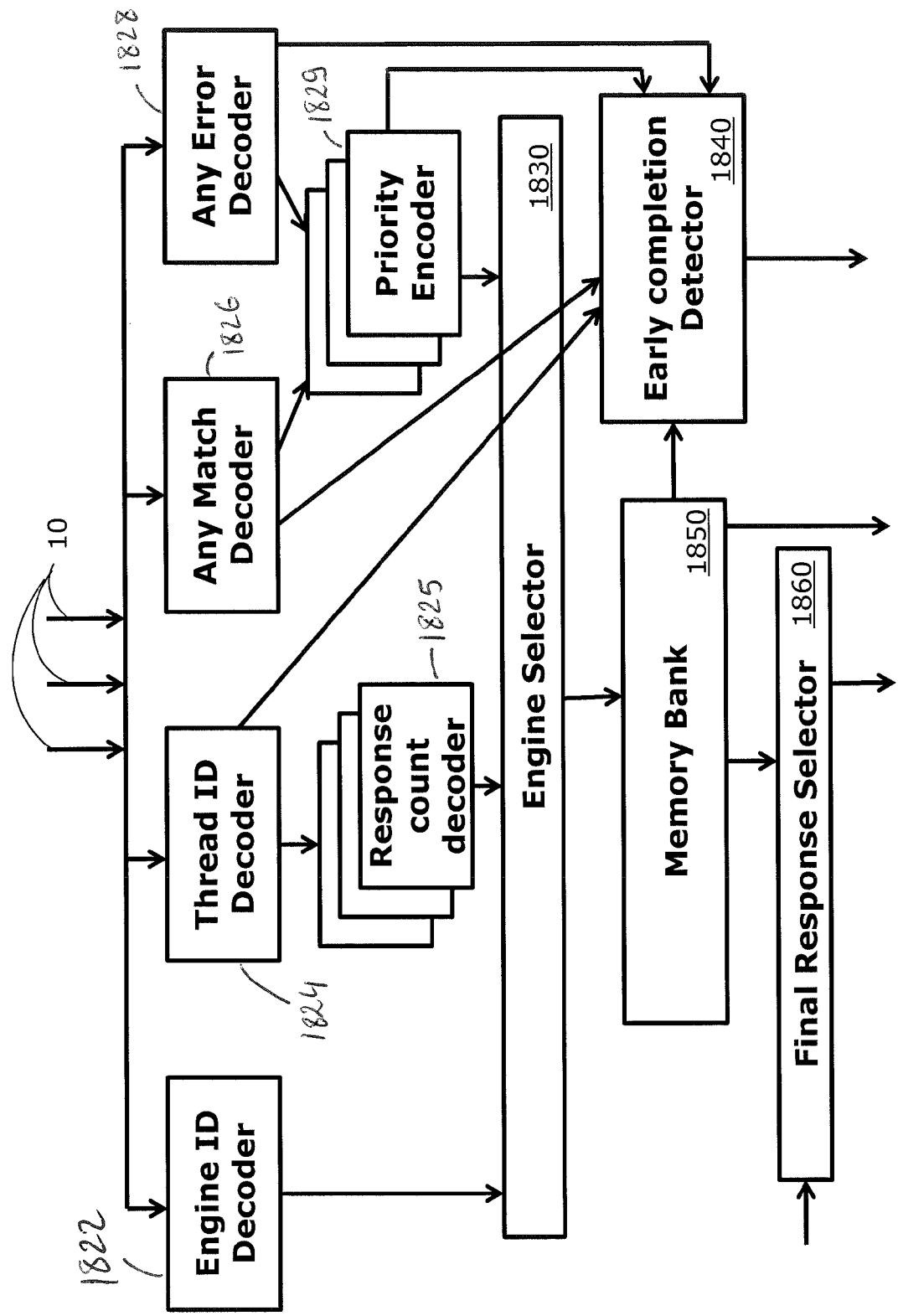

FIGS. 8A and 8B are block diagrams illustrating the architecture of a multi-bundle accumulator scoreboard (ACCS) 540, according to an example embodiment. In the example architecture shown in FIG. 8A, the ACCS 540 includes two accumulators 1810a and 1810b, also referred to hereinafter as 1810. In general, the ACCS 540 may include one or more accumulators 1810. Each accumulator 1810 is configured to accumulate or record rule matching results corresponding to rule matching threads 725, in association with respective rule matching threads' contexts, and determine a final or consolidated result to be reported to the respective BWE 514 or the host processor, e.g., 204, 214, 228, 242, or 244. For a rule matching thread 725, the respective context includes, for example, the priority value 723 of the rule matching thread 725 in the respective bundle 720, information related to the respective bundle 720, or a combination thereof. The priority value 723 may also be referred to as an identifier identifying the rule matching thread, e.g., thread ID. The information related to the respective bundle 720 includes, for example, an engine identifier (ID) identifying the BWE 514 that initiated the rule matching thread, an indication of the number of rule matching threads 725 in the given bundle 720, indication of masked priorities in the bundle, or a combination thereof. According to at least one scenario, the engine ID is an identifier of the bundle 720 and is indicative of the respective bundle priority.

The ACCS 540 also includes a bundle distributer 1811 configured to distribute and assign bundles 720, for which responses 10 are received from the RMEs 518, to different accumulators, e.g., 1810a and 1810b. The bundle distributer 1811 is configured to balance processing load of the one or more accumulators, e.g., 1810a and 1810b, for example, by providing a balanced distribution of bundles 720 among the one or more accumulators. According to at least one example embodiment, each accumulator 1810 is configured to operate independently of other accumulators in the ACCS 540.

Each accumulator 1810 is configured to exchange information with the BWEs 514. The accumulator 1810, for example, includes one or more communication ports to communicate with the BWEs 514. When a bundle of bucket entries is presented by a BWE 514 to a respective RWE 516, the BWE 514 sends a notification 629 to the ACCS 540 with information, e.g., "BWE_load," related to the bundle 720 presented to the RWE 516. The notification 629 may be assigned to one of the one or more accumulators, e.g., 1810a and 1810b, for example, by the load distributer 1810.

The information, e.g., "BWE_load," in the notification 629 includes, for example, a bundle identifier (ID), a count parameter indicative of the number of responses 10 to be expected from various RMEs 518 within the same bundle. Given that the ACCS 540 has two accumulators, it can handle two bundles from each BWE 514. The bundle ID may be, for example, 0 or 1. According to at least one example embodiment, the number of expected responses 10 is equal to the number of bucket entries in the bundle of bucket entries presented to the respective RWE 516. According to an example implementation, the count parameter is indicative of an integer value ranging from one to eight. The "BWE_load" may also include an indication of priorities to be masked. For example, if the accumulator 1810 assigns, by default, eight memory spots corresponding to eight expected responses 10 for each bundle 720 with eight respective priority values 723, e.g., 0, 1, . . . , 7, the indication of the priorities to be masked may be a reference to one of the priority values ranging from 0 to 6. For example, if the indication of the priorities to be masked is a reference to the number 2, then the priorities 0, 1, and 2 are masked, for example, as "X" or don't care, and only the priority values 3, 4, . . . , 7 are considered for the bundle 720.

The accumulator 1810 may also be configured to receive a signal, e.g., "BWE_NQ," including instruction to the accumulator 1810 to reset data associated with a given BWE 514 for that bundle. The accumulator 1810 may also be configured to receive a request, e.g., "Get_Rsp," from a BWE 514 requesting the ACCS 540 to send the final result to a host processor. Each accumulator 1810 is also configured to send a notification 637 to a respective BWE 514 indicative of a determined final result, or response, for a given bundle 720. Upon receiving the notification 637, the BWE 514 decides how to proceed. If the response is indicative of a "non-match", the BWE 514 may initiate another bucket request 620 to fetch bucket entries from the OCM component 324. If the response is indicative of an "error", the BWE 514 stops fetching bucket entries. The accumulator 1810 may also send an "Early_Completion" signal indicating that a final result is determined by the accumulator before receiving and processing all expected responses for a given bundle 720. The accumulator 1810 may also send a "Done" message to the respective BWE 514 indicating that processing for given bundle 720 is complete. In the case of an error, the "Done" message may indicate the error to the BWE 514. According to at least one example embodiment, the accumulator 1810 is configured to generate a final response message to be reported to the host processor or the BWE 514 within the notification 637. The final response message may include, for example, a parameter, e.g., "Valid" indicating a valid result with a "match" or "non-match" value, a parameter, e.g., "Error" indicating whether the final result is "Error" or not, a parameter indicative of the respective engine ID, a parameter indicative of the thread ID, or a combination thereof.

FIG. 8B is a block diagram illustrating the architecture of a single accumulator, according to at least one example embodiment. According to at least one example implementation, all the blocks shown in FIG. 8B are hardware components. The engine decoder module 1822 is configured to extract the engine ID from response data, corresponding to a respective bundle 720, received from a RME 518. The engine ID may also be viewed as an identifier of the bundle 720 given that a single bundle 720 from a given BWE 514 is being processed at any time. The extracted engine ID determines the BWE 514 and the bundle 720 to which the received response data belongs to. The thread ID decoder 1824 is configured to perform multi-field decoding. The thread ID decoder 1824 extracts the thread ID corresponding to the response data received from the RME 518. In extracting the thread ID, the thread ID decoder 1824 is configured to decode or extract the engine ID. The accumulator includes a response count decoder 1825 configured to determine the number of responses per clock cycle from multiple RMEs that belong to an Engine. This block also fills the appropriate columns in the scoreboard matrix. The match decoder module 1826 is configured to determine, for each BWE 514, if a valid response is a "match" or "non-match." The error decoder module 1828 is configured to determine, for each engine or BWE 514, whether a received rule matching result is an error or not. The priority encoder module 1829 is configured to determine the priority of the rule matching thread 725, for a given engine, for which an incoming response is being received and update a stored, or maintained, state vector, corresponding to the respective bundle, accordingly.

The engine selector module 1830 is configured to select the entries, in the memory bank 1850, corresponding to the respective bundle 720 to update. The early completion detector is configured to detect a final result for the bundle before receiving and processing of all expected responses for the same bundle. For example, if (1) an "error" or a "match" is received for a particular rule matching thread 725 in a given bundle 720 and (2) a "non-match" is received for every other rule matching thread, in the given bundle 720, with respective priority larger than that of the particular rule matching thread, the matching result received for the particular rule matching thread is selected as the final matching result without waiting for other matching results corresponding to the given bundle 720. By indicating the early completion to the respective BWE 514, the BWE 514 is allowed to stop pre-fetching further bucket entries. The final response selector module 1860 is configured to generate and send a consolidated response to the host processor upon a request from the BWE 514.

FIGS. 9A-9J describe representations of data maintained at the one or more memory banks 1850. The Table 1 in FIG. 9A describes a matrix or array of data 1900, corresponding to multiple bundles 720 of rule matching threads 725, maintained at the one or more memory banks 1859. Each row in the matrix 1900 stores data corresponding to a single bundle 720. The first column of the matrix 1900 stores values of the engine IDs, or BWE IDs. The ACCS 540 may, for example, handle two bundles per BWE 514, each bundle in a separate accumulator, e.g., 1810a and 1810b. The bundle ID distinguishes between the two bundles associated with the same BWE 514. The second column of the matrix 1900 stores a state vector "S" for each bundle 720 or BWE 514. The state vector S includes, for example, an indication whether the processing for the respective bundle 720 is complete or not, an indication of whether a match is recorded so far for the respective bundle 720, and indication of whether an error is recorded so far for the respective bundle 720, an indication of the number of expected responses in the respective bundle 720, an identification of the respective bundle 720, an indication of the thread ID indentifying the respective rule matching thread 725, and a reference to a first priority value 723 to be masked.

The last eight columns in the matrix 1900 maintain indications of matching results recorded for rule matching threads 725 with priority values 723, or thread IDs, ranging from 0 to 7. In these columns, "E" indicates a non-valid response, i.e., with indication of an error, "N" represents a valid response with a rule matching result equal to "non-match," and "M" indicates a "match." An empty entry means that no response is received yet for the respective rule matching thread 725. The "X" is indicative of a masked priority and that a response for the respective rule matching thread 725 is not expected.

The matrix 1900 is filled on the fly as responses for rule matching threads 725 in the different bundles 720 are received at the respective accumulator 1810. The data stored in the state vector S is used to generate a consolidated or final response for a given bundle 720 to report to the host processor, e.g., 204, 214, 228, 242, or 244, or the respective BWE 514.

FIGS. 9B-9J show example scenarios of data recorded for a single bundle 720. The integer indices associated with the recorded rule matching results represent the clock cycle at which the respective results were received. In FIG. 9B, a "non-match" is received first, e.g., at the clock cycle 0, for the rule matching thread with priority value equal to 7. Then, at the clock cycle 1, a "non-match" is received for the rule matching thread with priority value equal to 5. All the received responses indicate a "non-match" except for the rule matching thread with priority value equal to 0 for which a "match" is received at the clock cycle 7. At the same clock cycle a "match" is determined as the final result for the respective bundle 720, and an "Early_completion" and "Done" messages are sent also at the same clock cycle to the BWE 514.

In the scenario described in FIG. 9C, three "non-match" indications are received, at time=0, for the rule matching threads with priority values equal to 2, 3, and 4. Also, three "non-match" indications are received, at time=1, for the rule matching threads with priority values equal to 5, 6, and 7. At time=2, a "non-match" is received for the rule matching thread with priority value equal to 0, and a "match" is received for the rule matching thread with priority value equal to 1. The final result is determined at time=2 to be a "match," and an "Early_completion" and "Done" messages are sent at the same clock cycle to the BWE 514. A person skilled in the art should appreciate that multiple response for respective rule matching threads may be received at a single clock cycle.

The scenario shown in FIG. 9D, the priority values 0, 1, and 2 are masked and no response is expected for the respective rule matching threads. At time=0, an "error" is received for the rule matching thread with priority value equal to 4. At the clock cycles 1, 2, and 3, "non-match" indications are received for the rule matching threads with priority values equal to 7, 6, and 5, respectively. At time=4, a "match" is received for the rule matching thread with priority value equal to 3. Since a relatively small priority value is indicative of a relatively high priority, the rule matching thread with priority value equal to 3 is of higher priority than the rule matching thread with priority value equal to 4. As such, the final rule matching result for the respective bundle 720 is determined as a "match," at time=4. At the same clock cycle, an "Early_completion" and "Done" messages are sent to the BWE 514.

In the scenarios shown in FIG. 9E, a "non-match" is received at time 0 for the rule matching thread with highest priority, e.g., priority value=0. At the time=1, a "match" is received for the rule matching thread with priority value equal to 5. At the time instances, 2, 3, 4, 5, and 6, "non-match" indications are received, respectively, for the rule matching threads with priority values equal to 3, 6, 2, 1, and 4. That is, by the clock cycle=6, a "match" is already received for the rule matching thread with priority value equal to 5 and "non-match" is already received for rule matching threads with higher priorities, e.g., with priority values equal to 0, 1, 2, 3, and 4. Therefore an early "match is determined at the clock cycle=6, and an "Early_completion" signal is sent to the BWE 514 at the same clock cycle. At the clock cycle=7, a "Done" signal is sent to the BWE 514 indicating that all responses for the bundle 720 are already received.

In FIG. 9F, an early "match" is determined at the clock cycle=0 since at this time instance a "non-match" and a "match" are received for the rule matching threads with the highest and second highest priorities, respectively. An "Early_completion" signal is sent at the clock cycle=0 to the BWE 514. A "Done" signal is also sent to the BWE 514 at time=2, when all expected responses are already received.

In the scenario of FIG. 9G, an early match is determined at the clock cycle=0 and an "Early_completion" signal is sent to the BWE 514 at the same time. The entries with "X" indicate masked priorities. No response is expected for the rule matching threads corresponding to the masked priorities. The "Done" message is sent to the BWE 514 at the clock cycle=4. Even though an error is received at time=4 for the rule matching thread with priority value equal to 4, the rule matching thread for which a "match" was already received at time=0 is of higher priority. Therefore, the final result is a "match."

In the results shown in FIG. 9H, a "match" is received for the rule matching thread with lowest priority at time=0. At time=7, an "error" is received for the rule matching thread with highest priority. Indications of a "non-match" are received in between for the rest of the rule matching threads. As such, the final result is "error." The "early_completion" signal and the "Done" signal are sent to the BWE 514 at the clock cycle=7.

In the results shown in FIG. 9I, an "error" is received for the rule matching thread with highest priority at time=0. At the same time, an "Early_completion" signal is sent to the BWE 514 and the final result is determined as "error." At time=2, when all expected responses 10 are received, the "Done" signal is sent to the BWE 514.

In the scenario shown in FIG. 9J, an "error" is received for the rule matching thread with highest priority at time=0. At the same time, an "Early_completion" signal is sent to the BWE 514 indicating "error" as the determined final rule matching result. At time=4, when all expected responses 10 are received, the "Done" signal is sent to the BWE 514.

According to at least one example embodiment, when an "Early_completion" signal is sent to the BWE 514, an indication of the determined final rule matching result may also be sent to the BWE 514 at the same clock cycle.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing bundles of rule matching threads processed by one or more rule matching engines in a search processor, the method comprising:
    recording, for each rule matching thread in a given bundle of rule matching threads, a rule matching result in association with a priority corresponding to the respective rule matching thread;
    determining a final rule matching result, for the given bundle of rule matching threads, based at least in part on the priorities corresponding to the rule matching threads in the given bundle; and
    generating a response state indicative of the determined final rule matching result for reporting to a host processor.

2. A method according to claim 1 further comprising recording, for each rule matching thread in the given bundle of rule matching threads, an identification of a rule walking engine initiating the rule matching thread.

3. A method according to claim 1 further comprising recording a count of the number of rule matching threads in the given bundle of rule matching threads.

4. A method according to claim 1, wherein determining a final rule matching result includes:
    maintaining an indication of expected priorities associated with rule matching threads in the given bundle; and
    determining whether rule matching results are recorded for all rule matching threads associated with the expected priorities.

5. A method according to claim 1, wherein the rule matching result is indicative of a match, non-match, or error.

6. A method according to claim 5, wherein determining a final rule matching result for the given bundle includes:
    if the rule matching results recorded, corresponding to the rule matching threads in the given bundle, include at least one rule matching result indicative of a match or error, selecting from the at least one rule matching result indicative of a match or error the rule matching result with highest priority as the final rule matching result; or
    if the rule matching results recorded, corresponding to the rule matching threads in the given bundle, include no rule matching result indicative of a match or error, determining the final rule matching result as indicative of a non-match.

7. A method according to claim 1, wherein determining a final rule matching result includes determining a final rule matching result prior to recording all rule matching results associated with the rule matching threads in the given bundle.

8. A method according to claim 1 further comprising clearing rule matching results and respective indications of priorities upon generating the response state.

9. A method according to claim 1 further comprising:
    reporting the final rule matching result determined to a rule walking engine associated with the bundle of rule matching threads;
    receiving instruction from the rule walking engine to report the response state to the host processor; and
    reporting the response state to the host processor responsive to the received instruction.

10. A method according to claim 1, wherein two or more sets of bundles of rule matching threads are managed simultaneously.

11. A processor comprising:
    a plurality of rule walking engines configured to initiate bundles of rule matching threads;
    multiple rule matching engines configured to process the rule matching threads and provide respective rule matching results;
    a scoreboard module configured to:
        record, for each rule matching thread in a given bundle of rule matching threads, a rule matching result in association with a priority corresponding to the respective rule matching thread;
        determine a final rule matching result, for the given bundle of rule matching threads, based at least in part on the corresponding indications of priorities; and
        generate a response state indicative of the determined final rule matching result for reporting to a host processor.

12. A processor according to claim 11, wherein the scoreboard module is further configured to record, for each rule matching thread in the given bundle of rule matching threads, an identification of a rule walking engine initiating the rule matching thread.

13. A processor according to claim 11, wherein the scoreboard module is further configured to record a count of the number of rule matching threads in the given bundle of rule matching threads.

14. A processor according to claim 11, wherein in determining a final rule matching result, the scoreboard module is configured to:

maintain an indication of expected priorities associated with rule matching threads in the given bundle; and determine whether rule matching results are recorded for all rule matching threads associated with the expected priorities.

15. A processor according to claim 11, wherein the rule matching result is indicative of a match, non-match, or error.

16. A processor according to claim 15, wherein in determining a final rule matching result, the scoreboard module is configured to:

if the rule matching results recorded, corresponding to the rule matching threads in the given bundle, include at least one rule matching result indicative of a match or error, select from the at least one rule matching result indicative of a match or error the rule matching result with highest priority as the final rule matching result; or if the rule matching results recorded, corresponding to the rule matching threads in the given bundle, include no rule matching result indicative of a match or error, determine the final rule matching result as indicative of a non-match.

17. A processor according to claim 11, wherein in determining a final rule matching result, the scoreboard module is configured to determine a final rule matching result prior to recording all rule matching results associated with the rule matching threads in the given bundle.

18. A processor according to claim 11, wherein the scoreboard module is further configured to clear rule matching results and respective indications of priorities upon generating the response state.

19. A processor according to claim 11, wherein the scoreboard module is further configured to:

report the final rule matching result determined to a rule walking engine associated with the bundle of rule matching threads;

receive instruction from the rule walking engine to report the response state to the host processor; and report the response state to the host processor responsive to the received instruction.

20. A processor according to claim 11, wherein the processor comprises two or more scoreboard modules configured to manage, simultaneously, two or more sets of bundles of rule matching threads.

\* \* \* \* \*